(12) United States Patent
Chen et al.

(10) Patent No.: US 9,217,846 B2
(45) Date of Patent: Dec. 22, 2015

(54) IMAGING LENS, AND ELECTRONIC APPARATUS INCLUDING THE SAME

(71) Applicant: Genius Electronic Optical Co., Ltd., Taichung (TW)

(72) Inventors: Yan-Bin Chen, Xiamen (CN); Long Ye, Xiamen (CN); Feng Chen, Xiamen (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 52 days.

(21) Appl. No.: 14/279,997

(22) Filed: May 16, 2014

(65) Prior Publication Data

US 2015/0153545 A1    Jun. 4, 2015

(30) Foreign Application Priority Data

Nov. 29, 2013   (CN) .......................... 2013 1 0628447

(51) Int. Cl.
| | | |
|---|---|---|
| G02B 13/00 | (2006.01) | |
| H04N 5/225 | (2006.01) | |
| G02B 9/34 | (2006.01) | |
| G02B 3/04 | (2006.01) | |

(52) U.S. Cl.
CPC ................ G02B 13/004 (2013.01); G02B 9/34 (2013.01); H04N 5/2252 (2013.01); H04N 5/2254 (2013.01); *G02B 3/04* (2013.01)

(58) Field of Classification Search
CPC ............. G02B 13/0015; G02B 13/001; G02B 13/002; G02B 13/004; G02B 9/34; H04N 5/2252; H04N 5/2254
See application file for complete search history.

(56) References Cited

U.S. PATENT DOCUMENTS

| | | |
|---|---|---|
| 7,660,049 B2 | 2/2010 | Tang |
| 7,848,032 B1 | 12/2010 | Chen et al. |
| 7,911,715 B2 | 3/2011 | Shinohara |
| 8,014,080 B1 | 9/2011 | Chen et al. |
| 8,179,616 B1 | 5/2012 | Hsu et al. |
| 8,189,272 B1 | 5/2012 | Huang et al. |
| 8,274,593 B2 | 9/2012 | Chen et al. |
| 8,284,502 B2 | 10/2012 | Hsu et al. |
| 8,405,919 B2 | 3/2013 | Tsai et al. |
| 8,411,377 B2 | 4/2013 | Tsai et al. |
| 8,422,146 B1 | 4/2013 | Tsai et al. |
| 8,988,794 B2 * | 3/2015 | Ota ...................... G02B 13/004 359/715 |
| 9,001,436 B2 * | 4/2015 | Tsai ..................... G02B 13/004 359/715 |
| 2011/0069401 A1 | 3/2011 | Jo |
| 2011/0261470 A1 | 10/2011 | Chen et al. |
| 2011/0261471 A1 | 10/2011 | Taniyama |
| 2012/0044403 A1 | 2/2012 | Tang et al. |
| 2012/0140339 A1 | 6/2012 | Huang et al. |
| 2013/0044379 A1 | 2/2013 | Hsieh et al. |
| 2013/0063827 A1 | 3/2013 | Hsu et al. |
| 2013/0107378 A1 | 5/2013 | Kubota et al. |

(Continued)

FOREIGN PATENT DOCUMENTS

| | | |
|---|---|---|
| AD | 201300828 A | 1/2013 |
| CN | 103185958 A | 7/2013 |

(Continued)

*Primary Examiner* — David N Spector
(74) *Attorney, Agent, or Firm* — Baker & McKenzie LLP

(57) ABSTRACT

An imaging lens includes first to fourth lens elements arranged from an object side to an image side in the given order. Through designs of surfaces of the lens elements and relevant lens parameters, a short system length of the imaging lens maybe achieved while maintaining good optical performance.

18 Claims, 37 Drawing Sheets

(56) References Cited

U.S. PATENT DOCUMENTS

| | | | |
|---|---|---|---|
| 2015/0077622 A1* | 3/2015 | Ueno | G02B 13/0055 348/360 |
| 2015/0153543 A1* | 6/2015 | Chen | G02B 13/004 348/335 |

FOREIGN PATENT DOCUMENTS

| | | |
|---|---|---|
| JP | 2009003443 | 1/2009 |
| JP | 2009069196 | 4/2009 |
| JP | 2011227131 | 11/2011 |
| JP | 2011232449 | 11/2011 |
| KR | 1020110085465 | 7/2011 |
| KR | 1020120106021 | 9/2012 |
| TW | M354079 U | 4/2009 |
| TW | I309727 B | 5/2009 |
| TW | M356127 U | 5/2009 |
| TW | M360369 U | 7/2009 |
| TW | 201109712 A | 3/2011 |
| TW | 201137429 A | 11/2011 |
| TW | 201217853 A | 5/2012 |
| TW | 201229612 A | 7/2012 |
| TW | 201237497 A | 9/2012 |
| TW | 201300829 A | 1/2013 |
| TW | 201303352 A | 1/2013 |
| TW | 201312151 A | 3/2013 |
| TW | 201326885 A | 7/2013 |
| TW | 201331616 A | 8/2013 |
| WO | 2010140515 | 12/2010 |
| WO | 2013111612 | 8/2013 |

* cited by examiner

| system focal length =3.795 mm, half field-of-view = 36.816°, F-number =2.40 | | | | | | |
|---|---|---|---|---|---|---|
| surface | | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.467 | 0.704 | 1.544 | 56.114 | plastic | 2.359 |
| | image-side surface 32 | -8.758 | 0.077 | | | | |
| second lens element 4 | object-side surface 41 | -3.208 | 0.239 | 1.636 | 23.972 | plastic | -4.900 |
| | image-side surface 42 | 145.786 | 0.494 | | | | |
| third lens element 5 | object-side surface 51 | -2.283 | 0.977 | 1.535 | 55.635 | plastic | 3.825 |
| | image-side surface 52 | -1.242 | 0.650 | | | | |
| fourth lens element 6 | object-side surface 61 | -5.386 | 0.487 | 1.535 | 55.635 | plastic | -2.736 |
| | image-side surface 62 | 2.080 | 0.400 | | | | |
| optical filter 7 | object-side surface 71 | ∞ | 0.300 | | | | |
| | image-side surface 72 | ∞ | 0.264 | | | | |
| image plane 8 | | ∞ | | | | | |

FIG.3

| surface | 31 | 32 | 41 | 42 |
|---|---|---|---|---|
| K | -1.260E+00 | 7.338E+01 | -4.945E+01 | -3.419E+05 |
| a4 | -9.952E-04 | 8.217E-02 | 2.087E-01 | 3.913E-01 |
| a6 | 2.945E-01 | -1.233E-01 | -2.484E-01 | -5.744E-01 |
| a8 | -8.560E-01 | 6.309E-02 | -2.441E-01 | 9.246E-01 |
| a10 | 7.700E-01 | -1.285E+00 | 1.067E+00 | -3.312E-01 |
| a12 | 1.041E+00 | 2.631E+00 | -2.784E+00 | -1.897E+00 |
| a14 | -2.688E+00 | -1.661E+00 | 4.272E+00 | 3.565E+00 |
| a16 | 1.475E+00 | 1.234E-01 | -2.391E+00 | -1.865E+00 |
| surface | 51 | 52 | 61 | 62 |
| K | 3.498E+00 | -9.369E-01 | 3.705E+00 | -5.995E+00 |
| a4 | 2.413E-02 | 4.607E-02 | -5.088E-02 | -8.377E-02 |
| a6 | -1.800E-01 | -7.741E-02 | 9.366E-03 | 4.298E-02 |
| a8 | 5.018E-01 | 1.107E-01 | 1.313E-02 | -1.749E-02 |
| a10 | -7.505E-01 | -1.088E-01 | -6.833E-03 | 4.821E-03 |
| a12 | 5.518E-01 | 6.571E-02 | 1.503E-03 | -8.081E-04 |
| a14 | -1.160E-01 | -1.840E-02 | -1.631E-04 | 7.336E-05 |
| a16 | -3.105E-02 | 1.617E-03 | 7.167E-06 | -2.745E-06 |

FIG.4

| system focal length =3.679mm, half field-of-view =37.747°, F-number =2.40 | | | | | | |
|---|---|---|---|---|---|---|
| surface | | radius of curvature | thickness | refractive index | Abbe number | material | focal length |
| object | | ∞ | ∞ | | | | |
| aperture stop 2 | | ∞ | -0.190 | | | | |
| first lens element 3 | object-side surface 31 | 1.452 | 0.673 | 1.544 | 56.114 | plastic | 2.449 |
| | image-side surface 32 | -14.141 | 0.074 | | | | |
| second lens element 4 | object-side surface 41 | -4.802 | 0.250 | 1.636 | 23.972 | plastic | -4.871 |
| | image-side surface 42 | 9.078 | 0.592 | | | | |
| third lens element 5 | object-side surface 51 | -2.158 | 0.886 | 1.535 | 55.635 | plastic | 1.897 |
| | image-side surface 52 | -0.790 | 0.080 | | | | |
| fourth lens element 6 | object-side surface 61 | -7.017 | 0.650 | 1.535 | 55.635 | plastic | -1.745 |
| | image-side surface 62 | 1.115 | 0.400 | | | | |
| optical filter 7 | object-side surface 71 | ∞ | 0.300 | | | | |
| | image-side surface 72 | ∞ | 0.648 | | | | |
| image plane 8 | | ∞ | | | | | |

FIG.7

| surface | 31 | 32 | 41 | 42 |
|---|---|---|---|---|
| K | -9.962E-01 | 8.641E+01 | -1.428E+02 | 0.000E+00 |
| a4 | 8.254E-03 | 6.688E-02 | 1.241E-01 | 2.984E-01 |
| a6 | 2.252E-01 | -2.567E-01 | -2.186E-01 | -4.830E-01 |
| a8 | -7.479E-01 | 1.760E-01 | -3.129E-01 | 8.606E-01 |
| a10 | 8.194E-01 | -1.244E+00 | 1.042E+00 | -3.800E-01 |
| a12 | 8.780E-01 | 2.537E+00 | -2.639E+00 | -1.855E+00 |
| a14 | -2.903E+00 | -1.713E+00 | 4.412E+00 | 3.687E+00 |
| a16 | 1.786E+00 | 1.866E-01 | -2.608E+00 | -1.961E+00 |
| surface | 51 | 52 | 61 | 62 |
| K | 3.615E+00 | -2.898E+00 | 7.629E+00 | -8.437E+00 |
| a4 | -1.194E-03 | -9.970E-02 | -1.096E-02 | -7.388E-02 |
| a6 | -8.725E-02 | -1.512E-02 | -1.616E-03 | 4.023E-02 |
| a8 | 3.285E-01 | 9.024E-02 | 1.400E-02 | -1.729E-02 |
| a10 | -5.705E-01 | -1.091E-01 | -6.811E-03 | 4.797E-03 |
| a12 | 5.727E-01 | 7.233E-02 | 1.497E-03 | -8.020E-04 |
| a14 | -2.843E-01 | -1.963E-02 | -1.630E-04 | 7.357E-05 |
| a16 | 6.074E-02 | 1.005E-03 | 7.242E-06 | -2.837E-06 |

| system focal length =3.721mm, half field-of-view =36.776°, F-number =2.4 | | | | | | |
|---|---|---|---|---|---|---|
| | surface | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.403 | 0.614 | 1.544 | 56.114 | plastic | 2.260 |
| | image-side surface 32 | -8.649 | 0.094 | | | | |
| second lens element 4 | object-side surface 41 | -3.305 | 0.248 | 1.636 | 23.972 | plastic | -4.171 |
| | image-side surface 42 | 14.314 | 0.650 | | | | |
| third lens element 5 | object-side surface 51 | -1.601 | 0.788 | 1.535 | 55.635 | plastic | 2.205 |
| | image-side surface 52 | -0.797 | 0.246 | | | | |
| fourth lens element 6 | object-side surface 61 | -8.052 | 0.487 | 1.535 | 55.635 | plastic | -2.066 |
| | image-side surface 62 | 1.312 | 0.400 | | | | |
| optical filter 7 | object-side surface 71 | ∞ | 0.300 | | | | |
| | image-side surface 72 | ∞ | 0.709 | | | | |
| image plane 8 | | ∞ | | | | | |

| surface | 31 | 32 | 41 | 42 |
|---|---|---|---|---|
| K | -1.216E+00 | 9.103E+01 | -5.386E+01 | -2.049E+02 |
| a4 | 8.207E-04 | 1.090E-01 | 2.238E-01 | 4.244E-01 |
| a6 | 2.896E-01 | -2.457E-01 | -2.947E-01 | -5.717E-01 |
| a8 | -8.746E-01 | 1.324E-01 | -3.658E-01 | 8.418E-01 |
| a10 | 8.168E-01 | -1.274E+00 | 1.052E+00 | -3.961E-01 |
| a12 | 9.971E-01 | 2.538E+00 | -2.586E+00 | -1.746E+00 |
| a14 | -2.854E+00 | -1.691E+00 | 4.470E+00 | 3.833E+00 |
| a16 | 1.513E+00 | 2.462E-01 | -2.632E+00 | -2.196E+00 |
| surface | 51 | 52 | 61 | 62 |
| K | 1.715E+00 | -2.604E+00 | 9.467E+00 | -9.853E+00 |
| a4 | -1.144E-02 | -1.418E-01 | -1.836E-02 | -8.155E-02 |
| a6 | 2.758E-02 | 2.194E-02 | -2.863E-03 | 4.105E-02 |
| a8 | 1.327E-01 | 4.995E-02 | 1.422E-02 | -1.710E-02 |
| a10 | -4.119E-01 | -1.005E-01 | -6.775E-03 | 4.745E-03 |
| a12 | 6.308E-01 | 8.183E-02 | 1.494E-03 | -8.071E-04 |
| a14 | -3.990E-01 | -2.031E-02 | -1.642E-04 | 7.529E-05 |
| a16 | 1.186E-01 | -8.316E-04 | 7.305E-06 | -2.931E-06 |

FIG.12 system focal length =3.844mm, half field-of-view =36.429°, F-number =2.4

| surface | | radius of curvature | thickness | refractive index | Abbe number | material | focal length |
|---|---|---|---|---|---|---|---|
| object | | ∞ | ∞ | | | | |
| aperture stop 2 | | ∞ | -0.210 | | | | |
| first lens element 3 | object-side surface 31 | 1.391 | 0.645 | 1.544 | 56.114 | plastic | 2.274 |
| | image-side surface 32 | -9.654 | 0.080 | | | | |
| second lens element 4 | object-side surface 41 | -3.863 | 0.230 | 1.636 | 23.972 | plastic | -4.041 |
| | image-side surface 42 | 8.013 | 0.661 | | | | |
| third lens element 5 | object-side surface 51 | -1.779 | 0.777 | 1.535 | 55.635 | plastic | 2.313 |
| | image-side surface 52 | -0.842 | 0.178 | | | | |
| fourth lens element 6 | object-side surface 61 | -8.659 | 0.546 | 1.535 | 55.635 | plastic | -2.181 |
| | image-side surface 62 | 1.382 | 0.400 | | | | |
| optical filter 7 | object-side surface 71 | ∞ | 0.300 | | | | |
| | image-side surface 72 | ∞ | 0.747 | | | | |
| image plane 8 | | ∞ | | | | | |

FIG.15

| surface | 31 | 32 | 41 | 42 |
|---|---|---|---|---|
| K | -1.196E+00 | 8.288E+01 | -7.975E+01 | -1.277E+02 |
| a4 | 3.672E-03 | 1.152E-01 | 2.310E-01 | 4.112E-01 |
| a6 | 3.122E-01 | -1.513E-01 | -2.608E-01 | -5.709E-01 |
| a8 | -8.829E-01 | 1.156E-01 | -2.927E-01 | 8.660E-01 |
| a10 | 8.172E-01 | -1.328E+00 | 1.060E+00 | -3.764E-01 |
| a12 | 1.045E+00 | 2.545E+00 | -2.717E+00 | -1.762E+00 |
| a14 | -2.778E+00 | -1.643E+00 | 4.305E+00 | 3.789E+00 |
| a16 | 1.509E+00 | 1.823E-01 | -2.460E+00 | -2.152E+00 |
| surface | 51 | 52 | 61 | 62 |
| K | 2.179E+00 | -2.549E+00 | 1.039E+01 | -1.025E+01 |
| a4 | 6.680E-03 | -7.848E-02 | -1.675E-02 | -8.264E-02 |
| a6 | -7.390E-02 | -3.220E-02 | -2.743E-03 | 4.104E-02 |
| a8 | 2.817E-01 | 7.943E-02 | 1.413E-02 | -1.714E-02 |
| a10 | -5.074E-01 | -9.480E-02 | -6.777E-03 | 4.746E-03 |
| a12 | 5.718E-01 | 7.345E-02 | 1.496E-03 | -8.033E-04 |
| a14 | -3.157E-01 | -2.369E-02 | -1.641E-04 | 7.555E-05 |
| a16 | 7.227E-02 | 1.652E-03 | 7.222E-06 | -3.035E-06 |

FIG.16

| system focal length =3.712mm, half field-of-view =36.724°, F-number =2.458 | | | | | | |
|---|---|---|---|---|---|---|
| surface | | radius of curvature | thickness | refractive index | Abbe number | material | focal length |
| object | | ∞ | | | | | |
| aperture stop 2 | | ∞ | −0.200 | | | | |
| first lens element 3 | object-side surface 31 | 1.442 | 0.572 | 1.544 | 56.114 | plastic | 2.313 |
| | image-side surface 32 | −8.735 | 0.082 | | | | |
| second lens element 4 | object-side surface 41 | −5.208 | 0.336 | 1.636 | 23.972 | plastic | −4.072 |
| | image-side surface 42 | 5.352 | 0.628 | | | | |
| third lens element 5 | object-side surface 51 | −1.755 | 0.751 | 1.535 | 55.635 | plastic | 2.244 |
| | image-side surface 52 | −0.821 | 0.250 | | | | |
| fourth lens element 6 | object-side surface 61 | −8.005 | 0.504 | 1.535 | 55.635 | plastic | −2.138 |
| | image-side surface 62 | 1.367 | 0.400 | | | | |
| optical filter 7 | object-side surface 71 | ∞ | 0.300 | | | | |
| | image-side surface 72 | ∞ | 0.729 | | | | |
| image plane 8 | | ∞ | | | | | |

FIG.19

| surface | 31 | 32 | 41 | 42 |
|---|---|---|---|---|
| K | -1.147E+00 | 9.222E+01 | -2.459E+01 | -1.194E+02 |
| a4 | 2.752E-03 | 1.253E-01 | 2.207E-01 | 3.681E-01 |
| a6 | 2.791E-01 | -2.349E-01 | -2.881E-01 | -5.516E-01 |
| a8 | -8.738E-01 | 1.100E-01 | -3.720E-01 | 8.862E-01 |
| a10 | 8.311E-01 | -1.310E+00 | 1.004E+00 | -4.189E-01 |
| a12 | 1.027E+00 | 2.528E+00 | -2.654E+00 | -1.869E+00 |
| a14 | -2.835E+00 | -1.681E+00 | 4.455E+00 | 3.729E+00 |
| a16 | 1.375E+00 | 2.443E-01 | -2.479E+00 | -1.962E+00 |
| surface | 51 | 52 | 61 | 62 |
| K | 2.079E+00 | -2.662E+00 | 9.125E+00 | 9.280E+00 |
| a4 | -1.078E-02 | -1.430E-01 | -2.211E-02 | -8.547E-02 |
| a6 | 5.813E-02 | 3.190E-02 | -2.209E-03 | 4.157E-02 |
| a8 | 1.081E-01 | 5.605E-02 | 1.426E-02 | -1.714E-02 |
| a10 | -4.244E-01 | -1.025E-01 | -6.776E-03 | 4.741E-03 |
| a12 | 6.370E-01 | 7.843E-02 | 1.494E-03 | -8.063E-04 |
| a14 | -4.019E-01 | -2.133E-02 | -1.642E-04 | 7.546E-05 |
| a16 | 9.501E-02 | 2.727E-04 | 7.307E-06 | -2.923E-06 |

| system focal length =3.632mm, half field-of-view =38.095°, F-number =2.40 | | | | | | | |
|---|---|---|---|---|---|---|---|
| surface | | radius of curvature | thickness | refractive index | Abbe number | material | focal length |
| object | | ∞ | | | | | |
| aperture stop 2 | | ∞ | -0.190 | | | | |
| first lens element 3 | object-side surface 31 | 1.453 | 0.598 | 1.544 | 56.114 | plastic | 2.361 |
| | image-side surface 32 | -9.755 | 0.080 | | | | |
| second lens element 4 | object-side surface 41 | -4.797 | 0.362 | 1.636 | 23.972 | plastic | -4.578 |
| | image-side surface 42 | 7.756 | 0.500 | | | | |
| third lens element 5 | object-side surface 51 | -2.103 | 0.873 | 1.535 | 55.635 | plastic | 2.079 |
| | image-side surface 52 | -0.834 | 0.123 | | | | |
| fourth lens element 6 | object-side surface 61 | -6.818 | 0.670 | 1.535 | 55.635 | plastic | -1.890 |
| | image-side surface 62 | 1.231 | 0.400 | | | | |
| optical filter 7 | object-side surface 71 | ∞ | 0.300 | | | | |
| | image-side surface 72 | ∞ | 0.626 | | | | |
| image plane 8 | | ∞ | | | | | |

| surface | 31 | 32 | 41 | 42 |
|---|---|---|---|---|
| K | -1.047E+00 | 9.893E+01 | -8.509E+01 | -2.599E+02 |
| a4 | 6.579E-03 | 1.232E-01 | 1.479E-01 | 3.178E-01 |
| a6 | 2.624E-01 | -2.622E-01 | -2.455E-01 | -5.035E-01 |
| a8 | -8.251E-01 | 1.448E-01 | -3.203E-01 | 8.766E-01 |
| a10 | 8.275E-01 | -1.241E+00 | 1.050E+00 | -4.204E-01 |
| a12 | 9.528E-01 | 2.552E+00 | -2.622E+00 | -1.834E+00 |
| a14 | -2.885E+00 | -1.729E+00 | 4.415E+00 | 3.765E+00 |
| a16 | 1.634E+00 | 1.284E-01 | -2.694E+00 | -2.045E+00 |
| surface | 51 | 52 | 61 | 62 |
| K | 3.225E+00 | -2.899E+00 | 7.189E+00 | -8.699E+00 |
| a4 | 2.510E-02 | -1.034E-01 | -1.031E-02 | -7.478E-02 |
| a6 | -5.949E-02 | 1.552E-02 | -2.206E-03 | 4.006E-02 |
| a8 | 2.499E-01 | 7.103E-02 | 1.416E-02 | -1.713E-02 |
| a10 | -4.596E-01 | -1.044E-01 | -6.791E-03 | 4.764E-03 |
| a12 | 5.446E-01 | 7.449E-02 | 1.493E-03 | -8.045E-04 |
| a14 | -4.194E-01 | -2.107E-02 | -1.642E-04 | 7.507E-05 |
| a16 | 1.720E-01 | 1.159E-03 | 7.426E-06 | -2.954E-06 |

FIG.24

| system focal length =3.613mm, half field-of-view =38.277°, F-number =2.40 | | | | | | |
|---|---|---|---|---|---|---|
| surface | | radius of curvature | thickness | refractive index | Abbe number | material | focal length |
| object | | ∞ | | | | | |
| aperture stop 2 | | ∞ | -0.190 | | | | |
| first lens element 3 | object-side surface 31 | 1.444 | 0.673 | 1.544 | 56.114 | plastic | 2.809 |
| | image-side surface 32 | 20.787 | 0.101 | | | | |
| second lens element 4 | object-side surface 41 | -8.940 | 0.250 | 1.636 | 23.972 | plastic | -7.330 |
| | image-side surface 42 | 9.986 | 0.495 | | | | |
| third lens element 5 | object-side surface 51 | -2.214 | 0.925 | 1.535 | 55.635 | plastic | 1.899 |
| | image-side surface 52 | -0.799 | 0.082 | | | | |
| fourth lens element 6 | object-side surface 61 | -6.190 | 0.678 | 1.535 | 55.635 | plastic | -1.755 |
| | image-side surface 62 | 1.152 | 0.400 | | | | |
| optical filter 7 | object-side surface 71 | ∞ | 0.300 | | | | |
| | image-side surface 72 | ∞ | 0.648 | | | | |
| image plane 8 | | ∞ | | | | | |

FIG.27

| surface | 31 | 32 | 41 | 42 |
|---|---|---|---|---|
| K | -9.656E-01 | -6.936E+01 | -2.721E+02 | 0.000E+00 |
| a4 | 1.133E-02 | -1.245E-02 | 5.662E-02 | 2.270E-01 |
| a6 | 2.336E-01 | -2.372E-01 | -2.325E-01 | -4.188E-01 |
| a8 | -7.718E-01 | 1.840E-01 | -2.894E-01 | 8.604E-01 |
| a10 | 8.394E-01 | -1.222E+00 | 1.060E+00 | -4.009E-01 |
| a12 | 8.986E-01 | 2.527E+00 | -2.586E+00 | -1.838E+00 |
| a14 | -2.924E+00 | -1.764E+00 | 4.462E+00 | 3.716E+00 |
| a16 | 1.789E+00 | 2.006E-01 | -2.800E+00 | -2.007E+00 |
| surface | 51 | 52 | 61 | 62 |
| K | 3.942E+00 | -2.773E+00 | 6.269E+00 | -8.438E+00 |
| a4 | -4.195E-04 | -8.916E-02 | -7.399E-03 | -7.408E-02 |
| a6 | -5.586E-02 | -1.361E-02 | -1.597E-03 | 4.043E-02 |
| a8 | 2.879E-01 | 8.367E-02 | 1.400E-02 | -1.726E-02 |
| a10 | -5.058E-01 | -1.004E-01 | -6.813E-03 | 4.764E-03 |
| a12 | 5.602E-01 | 7.243E-02 | 1.497E-03 | -8.021E-04 |
| a14 | -3.421E-01 | -2.214E-02 | -1.630E-04 | 7.524E-05 |
| a16 | 1.122E-01 | 1.544E-03 | 7.335E-06 | -3.007E-06 |

FIG.28

| system focal length =3.821mm, half field-of-view =36.181°, F-number =2.40 | | | | | | | |
|---|---|---|---|---|---|---|---|
| surface | | radius of curvature | thickness | refractive index | Abbe number | material | focal length |
| object | | ∞ | ∞ | | | | |
| aperture stop 2 | | ∞ | -0.210 | | | | |
| first lens element 3 | object-side surface 31 | 1.480 | 0.774 | 1.544 | 56.114 | plastic | 2.485 |
| | image-side surface 32 | -13.265 | 0.106 | | | | |
| second lens element 4 | object-side surface 41 | -2.465 | 0.239 | 1.636 | 23.972 | plastic | -6.136 |
| | image-side surface 42 | -6.870 | 0.506 | | | | |
| third lens element 5 | object-side surface 51 | -2.087 | 0.916 | 1.535 | 55.635 | plastic | 3.833 |
| | image-side surface 52 | -1.194 | 0.598 | | | | |
| fourth lens element 6 | object-side surface 61 | -5.341 | 0.442 | 1.535 | 55.635 | plastic | -2.626 |
| | image-side surface 62 | 1.989 | 0.400 | | | | |
| optical filter 7 | object-side surface 71 | ∞ | 0.300 | | | | |
| | image-side surface 72 | ∞ | 0.336 | | | | |
| image plane 8 | | ∞ | | | | | |

FIG.31

| surface | 31 | 32 | 41 | 42 |
|---|---|---|---|---|
| K | -1.339E+00 | 1.144E+02 | -1.780E+01 | 5.190E+01 |
| a4 | -1.659E-03 | 1.098E-02 | 1.895E-01 | 4.267E-01 |
| a6 | 2.950E-01 | -1.075E-01 | -2.569E-01 | -5.661E-01 |
| a8 | -8.447E-01 | 9.131E-02 | -2.441E-01 | 9.344E-01 |
| a10 | 7.594E-01 | -1.289E+00 | 1.097E+00 | -3.428E-01 |
| a12 | 1.037E+00 | 2.621E+00 | -2.742E+00 | -1.915E+00 |
| a14 | -2.683E+00 | -1.648E+00 | 4.283E+00 | 3.548E+00 |
| a16 | 1.499E+00 | 1.283E-01 | -2.441E+00 | -1.763E+00 |
| surface | 51 | 52 | 61 | 62 |
| K | 2.979E+00 | -1.058E+00 | 3.558E+00 | -7.695E+00 |
| a4 | 4.887E-02 | 5.647E-02 | -5.197E-02 | -8.413E-02 |
| a6 | -1.876E-01 | -8.751E-02 | 9.890E-03 | 4.325E-02 |
| a8 | 5.011E-01 | 1.147E-01 | 1.312E-02 | -1.755E-02 |
| a10 | -7.545E-01 | -1.101E-01 | -6.834E-03 | 4.826E-03 |
| a12 | 5.356E-01 | 6.455E-02 | 1.502E-03 | -8.078E-04 |
| a14 | -1.292E-01 | -1.764E-02 | -1.633E-04 | 7.324E-05 |
| a16 | -6.554E-03 | 1.619E-03 | 7.235E-06 | -2.737E-06 |

FIG.32

|  | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| T1 | 0.704 | 0.673 | 0.614 | 0.645 | 0.572 | 0.598 | 0.673 | 0.774 |
| G12 | 0.077 | 0.074 | 0.094 | 0.080 | 0.082 | 0.080 | 0.101 | 0.106 |
| T2 | 0.239 | 0.250 | 0.248 | 0.230 | 0.336 | 0.362 | 0.250 | 0.239 |
| G23 | 0.494 | 0.592 | 0.650 | 0.661 | 0.628 | 0.500 | 0.495 | 0.506 |
| T3 | 0.977 | 0.886 | 0.788 | 0.777 | 0.751 | 0.873 | 0.925 | 0.916 |
| G34 | 0.650 | 0.080 | 0.246 | 0.178 | 0.250 | 0.123 | 0.082 | 0.598 |
| T4 | 0.487 | 0.650 | 0.487 | 0.546 | 0.504 | 0.670 | 0.678 | 0.442 |
| AAG | 1.221 | 0.746 | 0.990 | 0.919 | 0.960 | 0.703 | 0.678 | 1.210 |
| ALT | 2.407 | 2.459 | 2.137 | 2.198 | 2.163 | 2.503 | 2.526 | 2.371 |
| BFL | 0.964 | 1.348 | 1.409 | 1.447 | 1.429 | 1.326 | 1.348 | 1.036 |
| TTL | 4.592 | 4.553 | 4.536 | 4.564 | 4.552 | 4.532 | 4.552 | 4.617 |
| EFL | 3.795 | 3.679 | 3.721 | 3.845 | 3.712 | 3.632 | 3.613 | 3.821 |
| EFL/T4 | 7.793 | 5.660 | 7.641 | 7.042 | 7.365 | 5.421 | 5.329 | 8.645 |
| T3/G23 | 1.978 | 1.497 | 1.212 | 1.175 | 1.196 | 1.746 | 1.869 | 1.810 |

FIG.34

| | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| T4/(G12+G34) | 0.670 | 4.221 | 1.432 | 2.116 | 1.518 | 3.300 | 3.705 | 0.628 |
| T4/G34 | 0.749 | 8.125 | 1.980 | 3.067 | 2.016 | 5.447 | 8.268 | 0.739 |
| G23/(G12+G34) | 0.680 | 3.844 | 1.912 | 2.562 | 1.892 | 2.463 | 2.705 | 0.719 |
| AAG/T4 | 2.507 | 1.148 | 2.033 | 1.683 | 1.905 | 1.049 | 1.000 | 2.738 |
| T1/G23 | 1.425 | 1.137 | 0.945 | 0.976 | 0.911 | 1.196 | 1.360 | 1.530 |
| BFL/T2 | 4.033 | 5.392 | 5.681 | 6.291 | 4.253 | 3.663 | 5.392 | 4.335 |
| TTL/T4 | 9.429 | 7.005 | 9.314 | 8.359 | 9.032 | 6.764 | 6.714 | 10.446 |
| T2/G23 | 0.484 | 0.422 | 0.382 | 0.348 | 0.535 | 0.724 | 0.505 | 0.472 |
| BFL/(G12+G34) | 1.326 | 8.753 | 4.144 | 5.609 | 4.304 | 6.532 | 7.366 | 1.472 |
| ALT/G23 | 4.872 | 4.154 | 3.288 | 3.325 | 3.444 | 5.006 | 5.103 | 4.686 |
| BFL/T1 | 1.369 | 2.003 | 2.295 | 2.243 | 2.498 | 2.217 | 2.003 | 1.339 |
| T3/T4 | 2.006 | 1.363 | 1.618 | 1.423 | 1.490 | 1.303 | 1.364 | 2.072 |
| T2/T4 | 0.491 | 0.385 | 0.509 | 0.421 | 0.667 | 0.540 | 0.369 | 0.541 |

FIG.35

IMAGING LENS, AND ELECTRONIC APPARATUS INCLUDING THE SAME

CROSS-REFERENCE TO RELATED APPLICATION

This application claims priority to Chinese Application No. 201310628447.9, filed on Nov. 29, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. Pat. Nos. 7,848,032, 8,284,502, 8,179,616, and TW patent publication no. 201109712 discloses a conventional imaging lens that includes four lens elements, and that has a system length of over 8mm. Particularly, the imaging lens disclosed in U.S. Pat. No. 8,179,616 has a system length of over 11 mm, which disfavors reducing thickness of portable electronic devices, such as mobile phones and digital cameras.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element and a fourth lens element arranged in order from an object side to an image side along an optical axis of the imaging lens. Each of the first lens element, the second lens element, the third lens element and the fourth lens element has a refractive power, an object-side surface facing toward the object side, and an image-side surface facing toward the image side.

The image-side surface of the first lens element has a convex portion in a vicinity of a periphery of the first lens element. The object-side surface of the second lens element has a concave portion in a vicinity of a periphery of the second lens element. The third lens element has a positive refractive power, and the image-side surface of the third lens element has a convex portion in a vicinity of a periphery of the third lens element. The fourth lens element is made of a plastic material, and the object-side surface of the fourth lens element has a concave portion in a vicinity of the optical axis, and a convex portion in a vicinity of a periphery of the fourth lens element.

The imaging lens does not include any lens element with refractive power other than the first lens element, the second lens element, the third lens element and the fourth lens element.

Another object of the present invention is to provide an electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 7 shows values of some optical data corresponding to the imaging lens of the second preferred embodiment;

FIG. 8 shows values of some aspherical coefficients corresponding to the imaging lens of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 shows values of some aspherical coefficients corresponding to the imaging lens of the sixth preferred embodiment;

FIG. 27 shows values of some optical data corresponding to the imaging lens of the seventh preferred embodiment;

FIG. 28 shows values of some aspherical coefficients corresponding to the imaging lens of the seventh preferred embodiment;

FIG. 31 shows values of some optical data corresponding to the imaging lens of the eighth preferred embodiment;

FIG. 32 shows values of some aspherical coefficients corresponding to the imaging lens of the eighth preferred embodiment;

FIGS. 34 and 35 are tables that list values of relationships among some lens parameters corresponding to the imaging lenses of the first to eighth preferred embodiments;

DETAILED DESCRIPTION OF THE PREFERRED EMBODIMENTS

Figure 1:
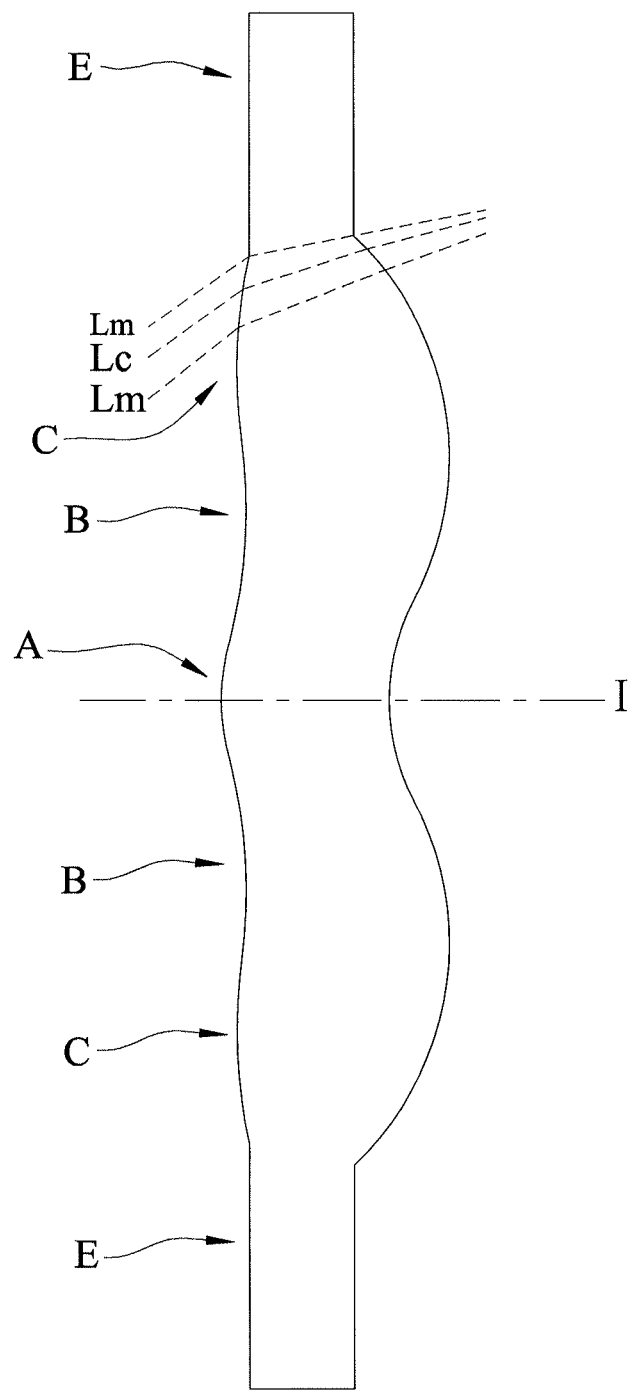
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
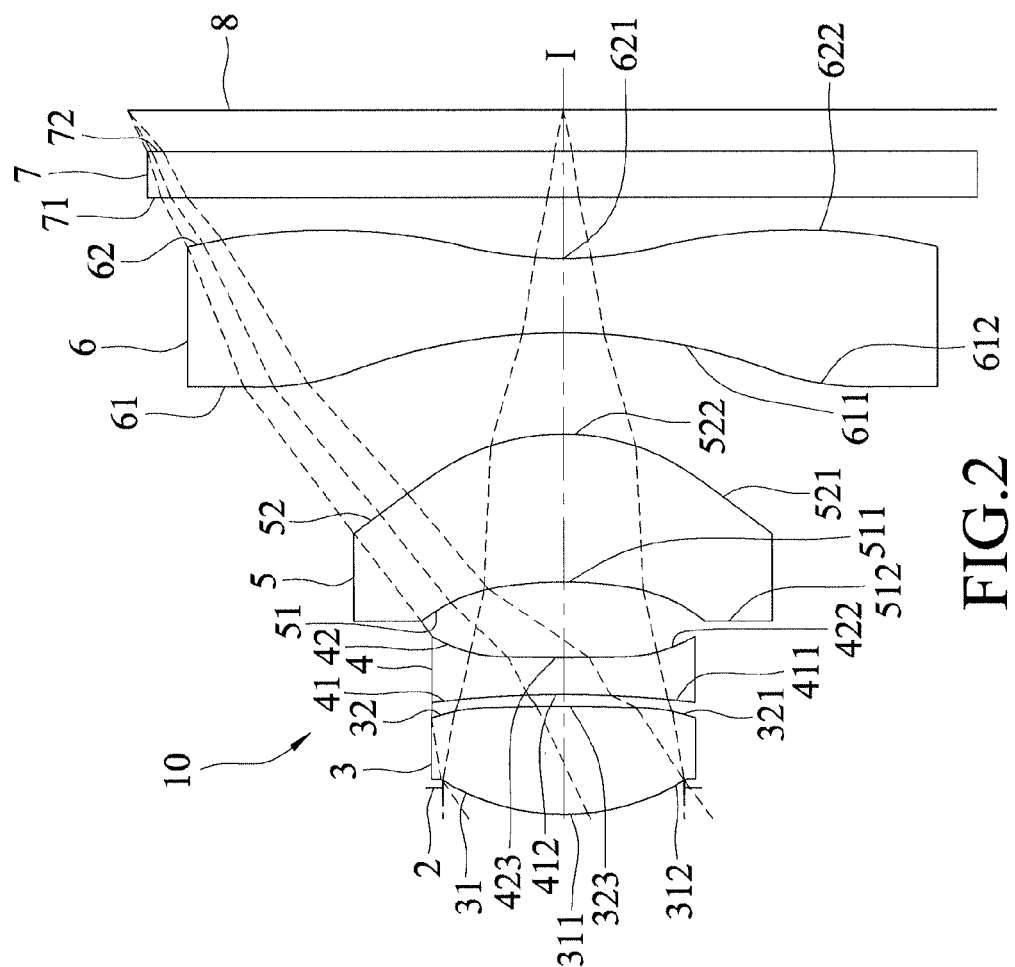
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6 and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. In this embodiment, each of the object-side surfaces 31, 41, 51, 61 and the image-side surfaces 32, 42, 52, 62 is aspherical and has a center point coinciding with the optical axis (I).

In the first preferred embodiment, which is depicted in FIG. 2, the first lens element 3 has a positive refractive power. The object-side surface 31 of the first lens element 3 is a convex surface has a convex portion 311 in a vicinity of the optical axis (I), and a convex portion 312 in a vicinity of a periphery of the first lens element 3. The image-side surface 32 of the first lens element 3 is a convex surface that has a convex portion 323 in a vicinity of the optical axis (I), and a convex portion 321 in a vicinity of a periphery of the first lens element 3.

The second lens element 4 has a negative refractive power. The object-side surface 41 of the second lens element 4 is a concave surface that has a concave portion 412 in a vicinity of the optical axis (I), and a concave portion 411 in a vicinity of a periphery of the second lens element 4. The image-side surface 42 of the second lens element 4 is a concave surface has a concave portion 423 in a vicinity of the optical axis (I), and a convex portion 422 in a vicinity of a periphery of the second lens element 4.

The third lens element 5 has a positive refractive power. The object-side surface 51 of the third lens element 5 is a concave surface has a concave portion 511 in a vicinity of the optical axis (I), and a concave portion 512 in a vicinity of a periphery of the third lens element 5. The image-side surface 52 of the third lens element 5 is a convex surface that has a convex portion 522 in a vicinity of the optical axis (I), and a convex portion 521 in a vicinity of a periphery of the third lens element 5.

The fourth lens element 6 has a negative refractive power. The object-side surface 61 of the fourth lens element 6 has a concave portion 611 in a vicinity of the optical axis (I), and a convex portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

In the first preferred embodiment, the imaging lens 10 does not include any lens element with refractive power other than the aforesaid lens elements 3-6.

Shown in FIG. 3 is a table that lists values of some optical data corresponding to the surfaces 31-71, 32-72 of the first preferred embodiment. The imaging lens 10 has an overall system effective focal length (EFL) of 3.795 mm, a half field-of-view (HFOV) of 36.816°, an F-number of 2.4, and a system length (TTL) of 4.592 mm. The system length refers to a distance between the object-side surface 31 of the first lens element 3 and the image plane 8 at the optical axis (I).

In this embodiment, each of the object-side surfaces 31-61 and the image-side surfaces 32-62 is aspherical, and satisfies the relationship of $$Z(Y) = \frac{Y^2}{R} \bigg/ \left(1 + \sqrt{1+(1+K)\frac{Y^2}{R^2}}\right) + \sum_{i=1}^{n} a_{2i} \times Y^{2i} \quad (1)$$

where:

Y represents a perpendicular distance between an arbitrary point on an aspherical surface and the optical axis (I);

Z represents a depth of the aspherical surface, which is defined as a perpendicular distance between the arbitrary point on the aspherical surface that is spaced apart from the optical axis (I) by a distance Y, and a tangent plane at a vertex of the aspherical surface at the optical axis (I);

R represents a radius of curvature of the aspherical surface;

K represents a conic constant; and $a_{2i}$ represents a $2i^{th}$ aspherical coefficient.

Shown in FIG. 4 is a table that lists values of some aspherical coefficients of the aforementioned relationship (1) corresponding to the first preferred embodiment.

Relationships among some of the aforementioned lens parameters corresponding to the first preferred embodiment are shown in columns of FIGS. 34 and 35 corresponding to the first preferred embodiment, where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

TTL represents a distance at the optical axis (I) between the object-side surface 31 of the first lens element 3 and the image plane 8 at the image side;

BFL represents a distance at the optical axis (I) between the image-side surface 62 of the fourth lens element 6 and the image plane 8 at the image side;

ALT represents a sum of the thicknesses of the first lens element 3, the second lens element 4, the third lens element 5 and the fourth lens element 6 at the optical axis (I);

AAG represents a sum of the air gap lengths among the first lens element 3, the second lens element 4, the third lens element 5, and the fourth lens element 6 at the optical axis (I); and EFL represents a system focal length of the imaging lens 10.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figures 5A, 5B, 5C, 5D:
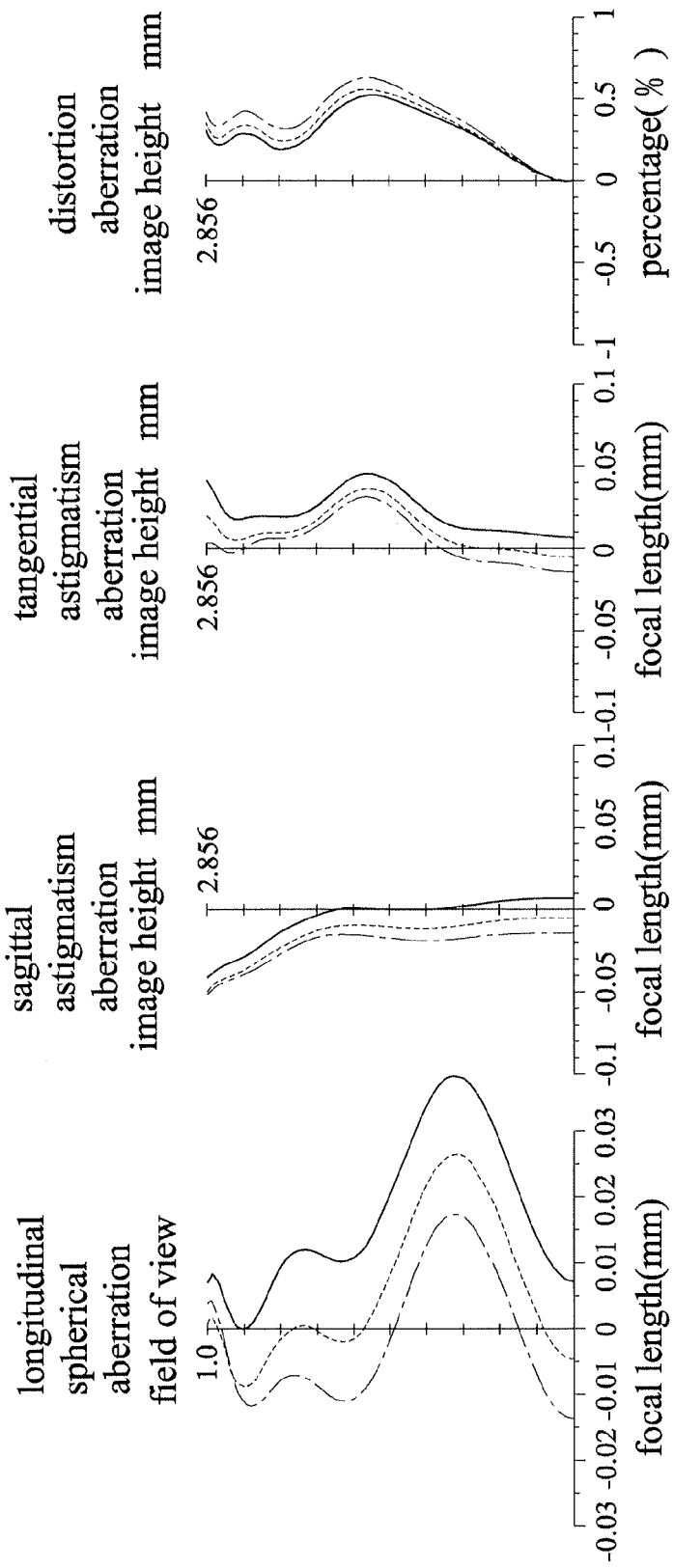
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.05 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.05 mm of focal length, the first preferred embodiment has a relatively low optical aberration.

Moreover, as shown in FIG. 5(d), since each of the curves corresponding to distortion aberration falls within the range of ±1%, the first preferred embodiment is able to meet requirements in imaging quality of most optical systems.

In view of the above, even with the system length reduced down to 4.592 mm, the imaging lens 10 of the first preferred embodiment is still able to achieve a relatively good optical performance.

Figure 6:
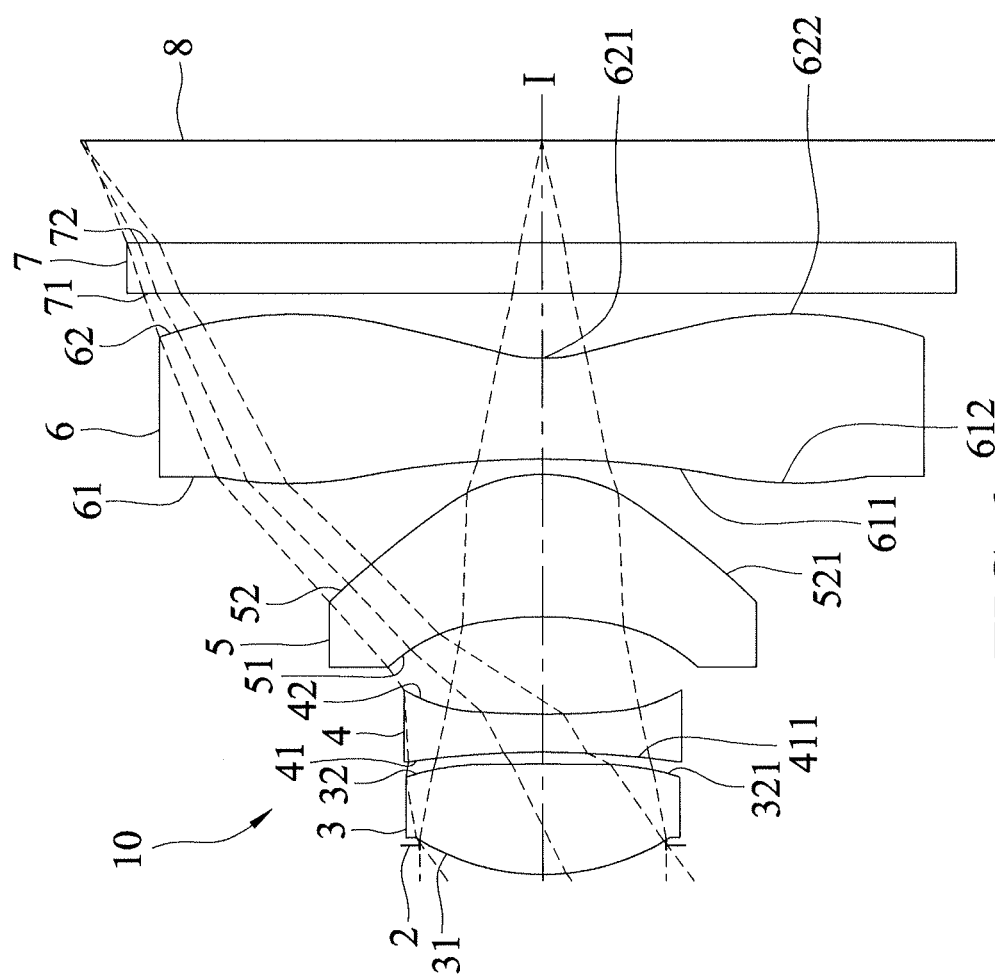
FIG. 6 is a schematic diagram that illustrates the second preferred embodiment of an imaging lens according to the present invention.
Figure 9:
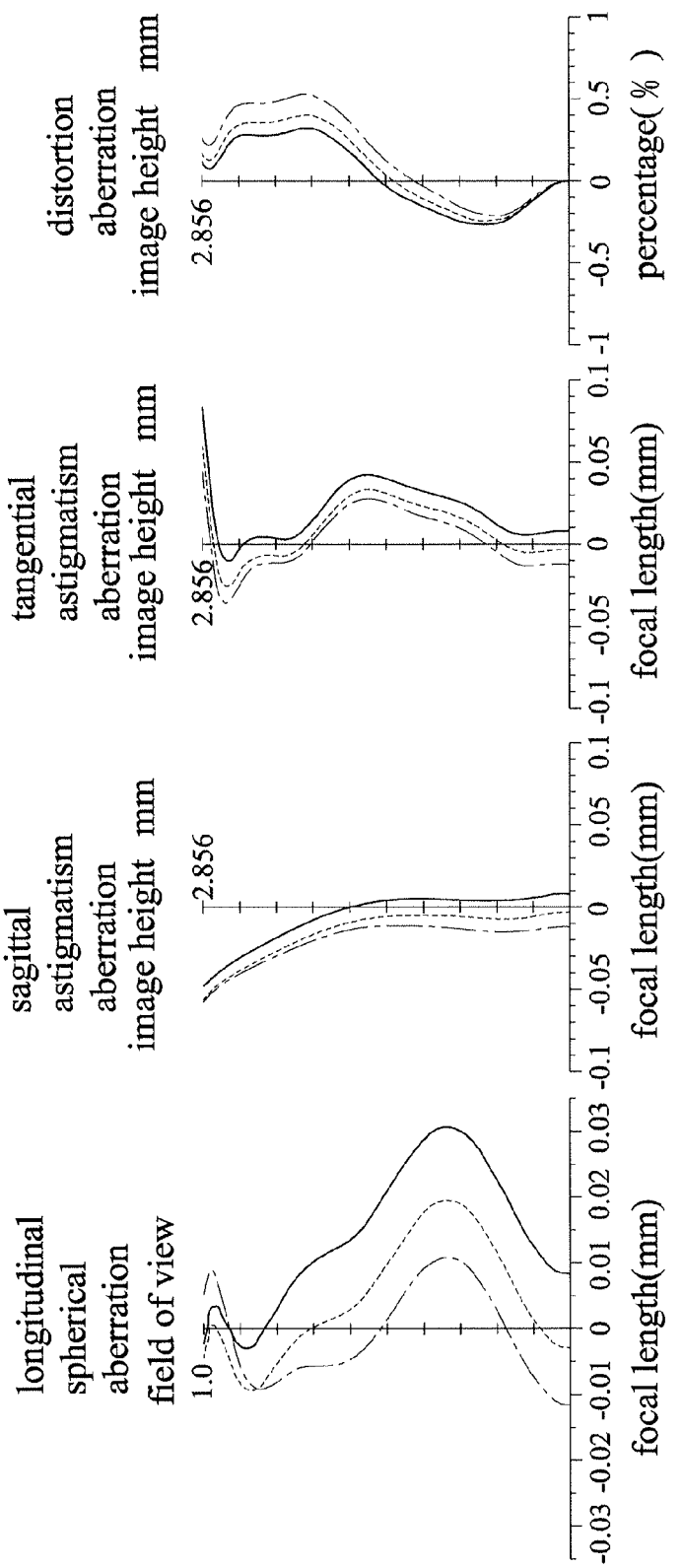
FIGS. 9(a) to 9(d) show different optical characteristics of the imaging lens of the second preferred embodiment.

FIG. 6 illustrates the second preferred embodiment of the imaging lens 10 according to the present invention, which has a configuration similar to that of the first preferred embodiment.

Shown in FIG. 7 is a table that lists values of some optical data corresponding to the surfaces 31-71, 32-72 of the second preferred embodiment. The imaging lens 10 of the second preferred embodiment has an overall system effective focal length (EFL) of 3.679 mm, a half field-of-view (HFOV) of 37.747°, an F-number of 2.4, and a system length (TTL) of 4.553 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are shown in columns of FIGS. 34 and 35 corresponding to the second preferred embodiment.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
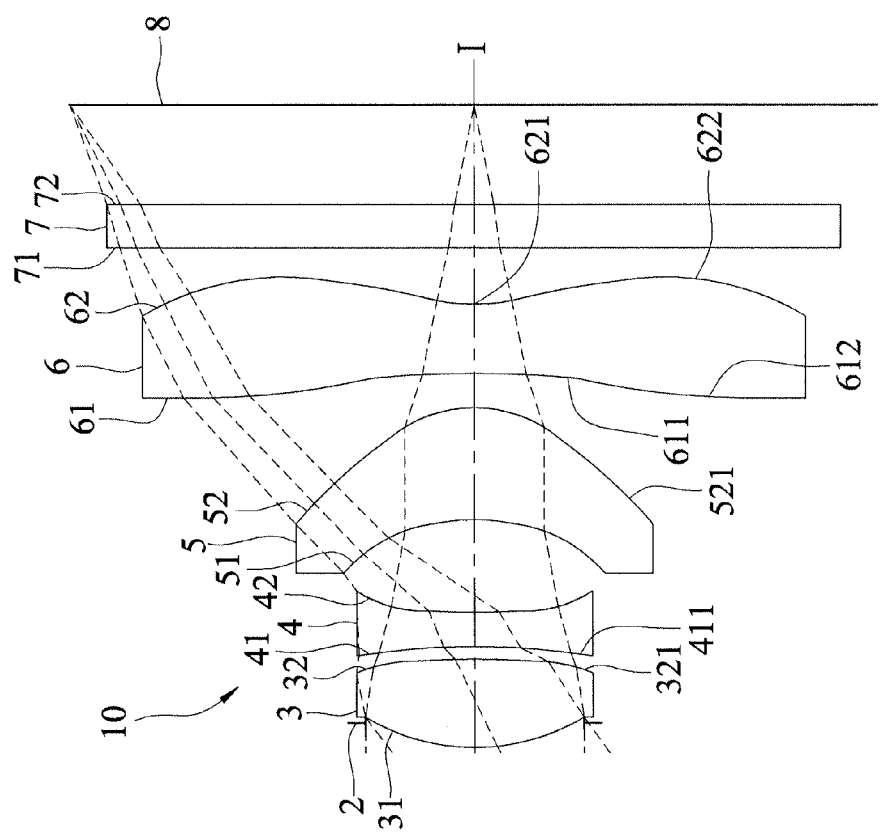
FIG. 10 is a schematic diagram that illustrates the third preferred embodiment of an imaging lens according to the present invention.

FIG. 10 illustrates a third preferred embodiment of an imaging lens 10 according to the present invention, which has a configuration similar to that of the first preferred embodiment.

Shown in FIG. 11 is a table that lists values of some optical data corresponding to the surfaces 31-71, 32-72 of the third preferred embodiment. The imaging lens 10 has an overall system focal length of 3.721 mm, an HFOV of 36.776°, an F-number of 2.4, and a system length of 4.536 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are shown in columns of FIGS. 34 and 35 corresponding to the third preferred embodiment.

Figure 13:
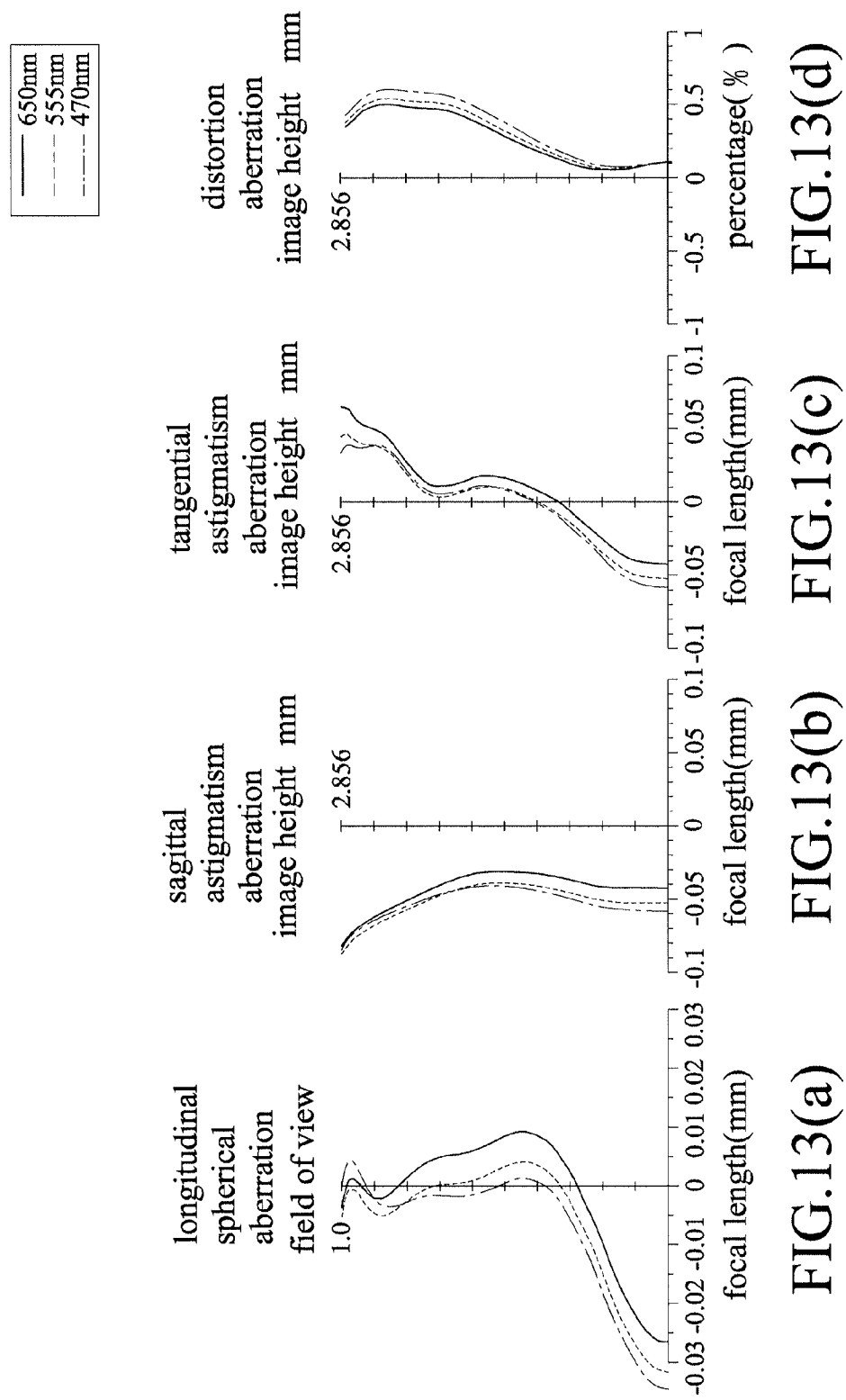
FIGS. 13(a) to 13(d) show different optical characteristics of the imaging lens of the third preferred embodiment.

FIGS. 13(*a*) to 13(*d*) respectively show simulation results corresponding to longitudinal spherical aberration, sagittal astigmatism aberration, tangential astigmatism aberration, and distortion aberration of the third preferred embodiment. It can be understood from FIGS. 13(*a*) to 13(*d*) that the third preferred embodiment is able to achieve a relatively good optical performance.

Figure 14:
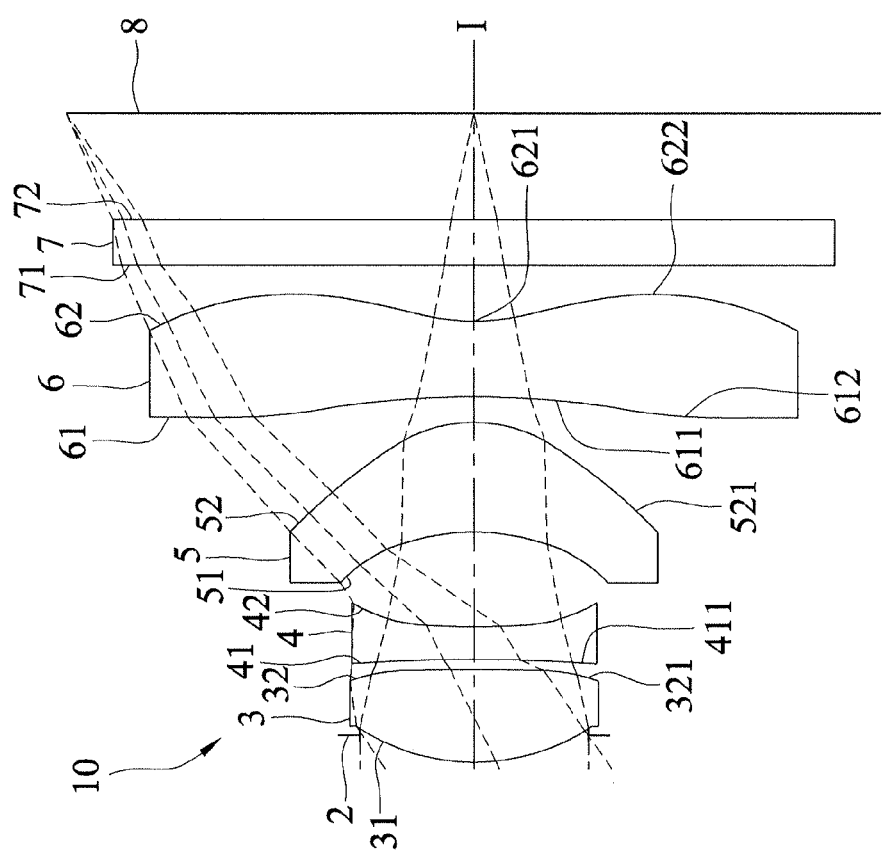
FIG. 14 is a schematic diagram that illustrates the fourth preferred embodiment of an imaging lens according to the present invention.

FIG. 14 illustrates a fourth preferred embodiment of the imaging lens 10 of this invention, which has a configuration similar to that of the first preferred embodiment.

Shown in FIG. 15 is a table that lists values of some optical data corresponding to the surfaces 31-71, 32-72 of the fourth preferred embodiment. The imaging lens 10 has an overall system focal length of 3.844 mm, an HFOV of 36.429°, an F-number of 2.4, and a system length of 4.564 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are shown in columns of FIGS. 34 and 35 corresponding to the fourth preferred embodiment.

Figures 17A, 17B, 17C, 17D:
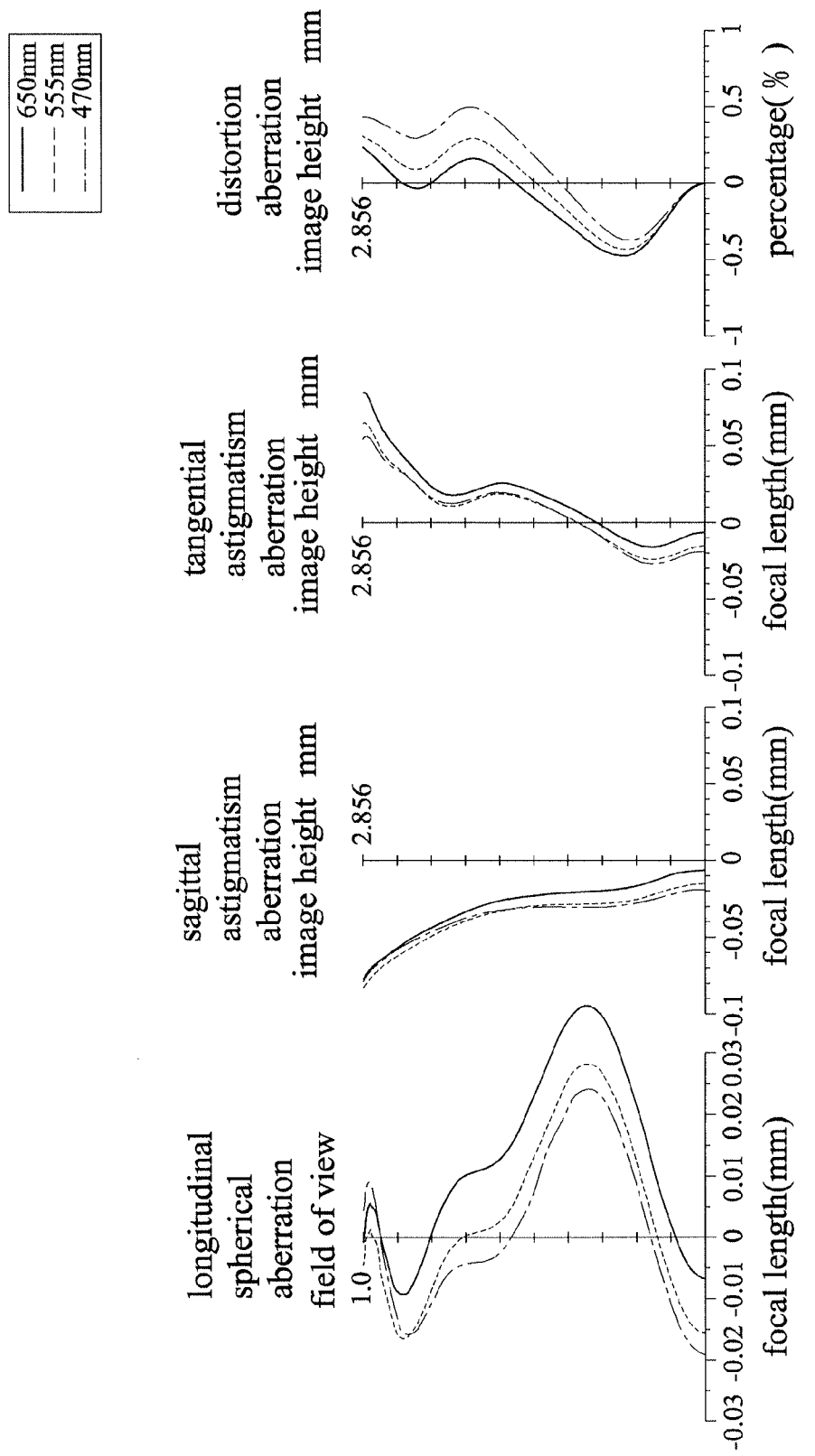
FIGS. 17(a) to 17(d) show different optical characteristics of the imaging lens of the fourth preferred embodiment.

FIGS. 17(*a*) to 17(*d*) respectively show simulation results corresponding to longitudinal spherical aberration, sagittal astigmatism aberration, tangential astigmatism aberration, and distortion aberration of the fourth preferred embodiment. It can be understood from FIGS. 17(*a*) to 17(*d*) that the fourth preferred embodiment is able to achieve a relatively good optical performance.

Figure 18:
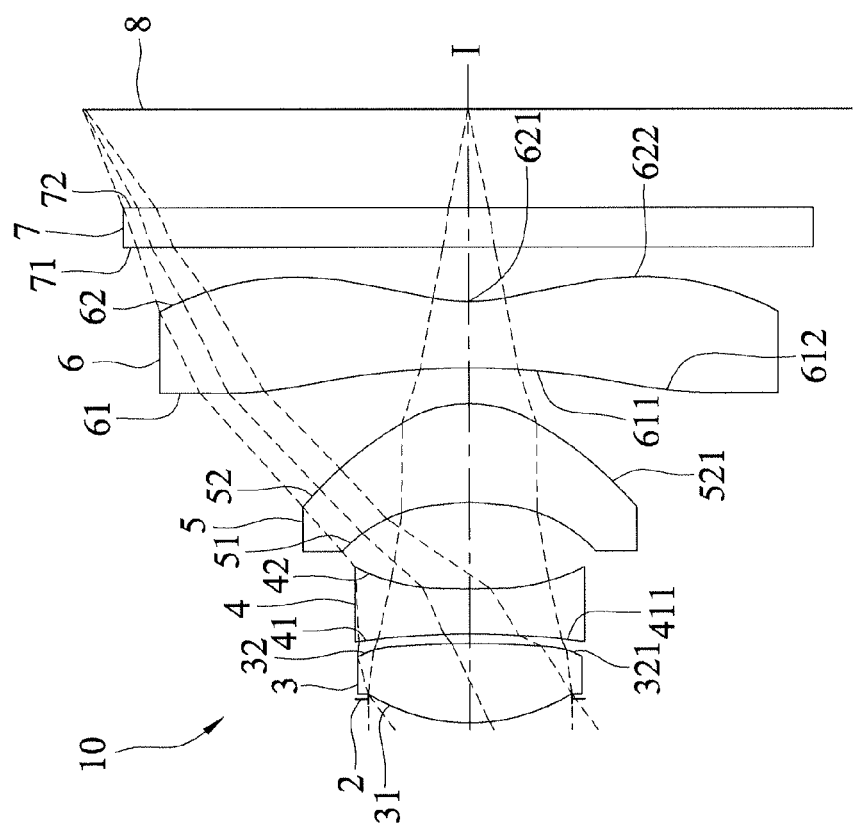
FIG. 18 is a schematic diagram that illustrates the fifth preferred embodiment of an imaging lens according to the present invention.

FIG. 18 illustrates a fifth preferred embodiment of the imaging lens 10 of this invention, which has a configuration similar to that of the first preferred embodiment.

Shown in FIG. 19 is a table that lists values of some optical data corresponding to the surfaces 31-71, 32-72 of the fifth preferred embodiment. The imaging lens 10 has an overall system focal length of 3.712 mm, an HFOV of 36.724°, an F-number of 2.458, and a system length of 4.552 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are shown in columns of FIGS. 34 and 35 corresponding to the fifth preferred embodiment.

Figures 21A, 21B, 21C, 21D:
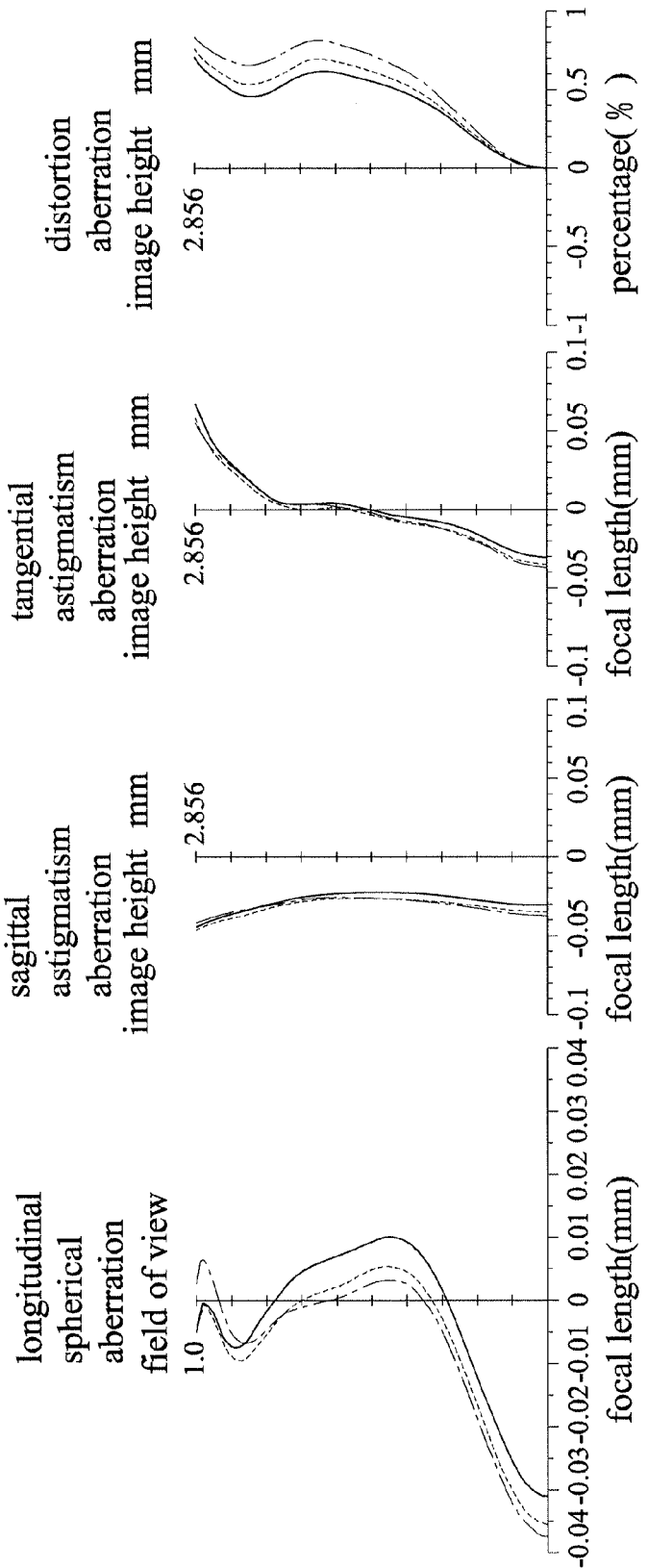
FIGS. 21(a) to 21(d) show different optical characteristics of the imaging lens of the fifth preferred embodiment.

FIGS. 21(*a*) to 21(*d*) respectively show simulation results corresponding to longitudinal spherical aberration, sagittal astigmatism aberration, tangential astigmatism aberration, and distortion aberration of the fifth preferred embodiment. It can be understood from FIGS. 21(*a*) to 21(*d*) that the fifth preferred embodiment is able to achieve a relatively good optical performance.

Figure 22:
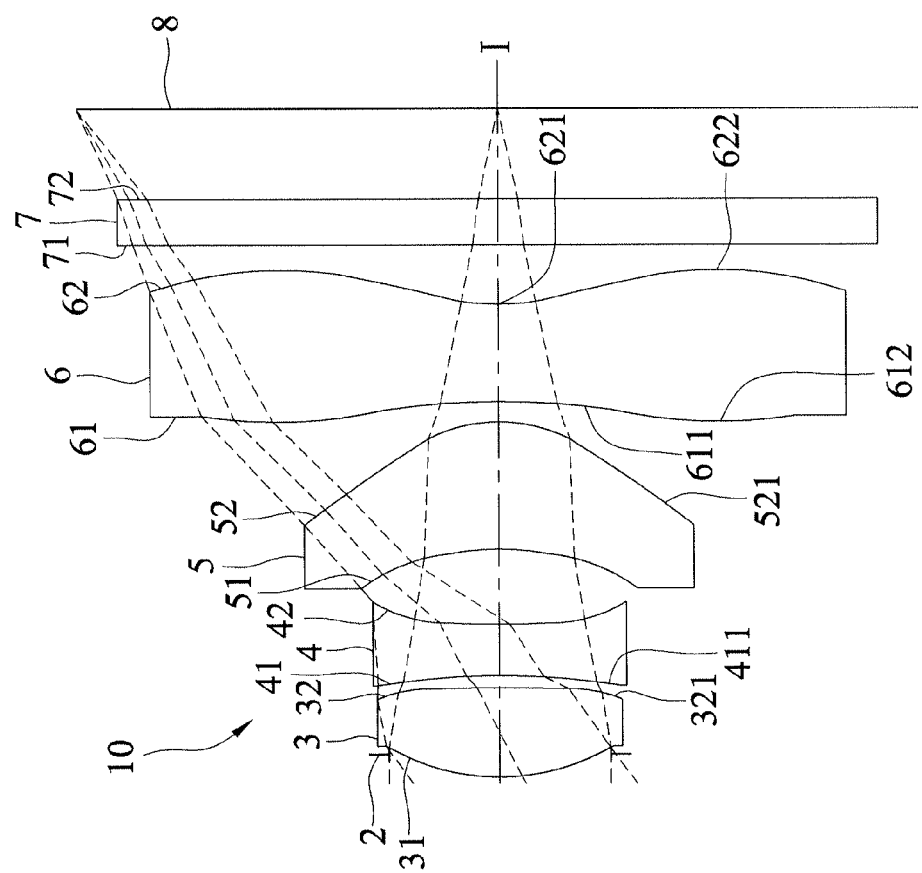
FIG. 22 is a schematic diagram that illustrates the sixth preferred embodiment of an imaging lens according to the present invention.

FIG. 22 illustrates the sixth preferred embodiment of an imaging lens 10 according to the present invention, which has a configuration similar to that of the first preferred embodiment.

Shown in FIG. 23 is a table that lists values of some optical data corresponding to the surfaces 31-71, 32-72 of the sixth preferred embodiment. The imaging lens 10 has an overall system focal length of 3.632 mm, an HFOV of 38.095°, an F-number of 2.40, and a system length of 4.532 mm.

Shown in FIG. 24 is a table that lists values of some aspherical coefficients of the aforementioned relationship (1) corresponding to the sixth preferred embodiment.

Relationships among some of the aforementioned lens parameters corresponding to the sixth preferred embodiment are shown in columns of FIGS. 34 and 35 corresponding to the sixth preferred embodiment.

Figures 25A, 25B, 25C, 25D:
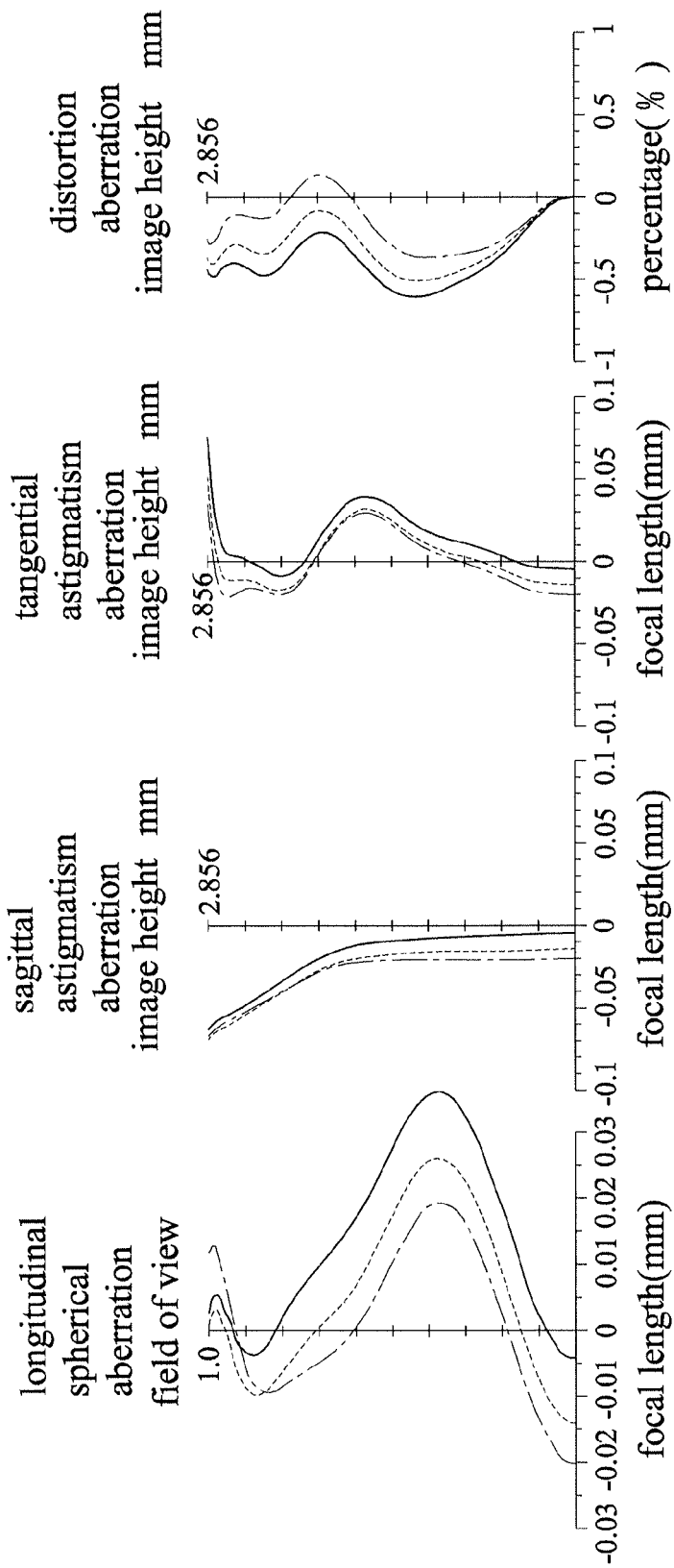
FIGS. 25(a) to 25(d) show different optical characteristics of the imaging lens of the sixth preferred embodiment.

FIGS. 25(*a*) to 25(*d*) respectively show simulation results corresponding to longitudinal spherical aberration, sagittal astigmatism aberration, tangential astigmatism aberration, and distortion aberration of the sixth preferred embodiment. It can be understood from FIGS. 25(*a*) to 25(*d*) that the sixth preferred embodiment is able to achieve a relatively good optical performance.

Figure 26:
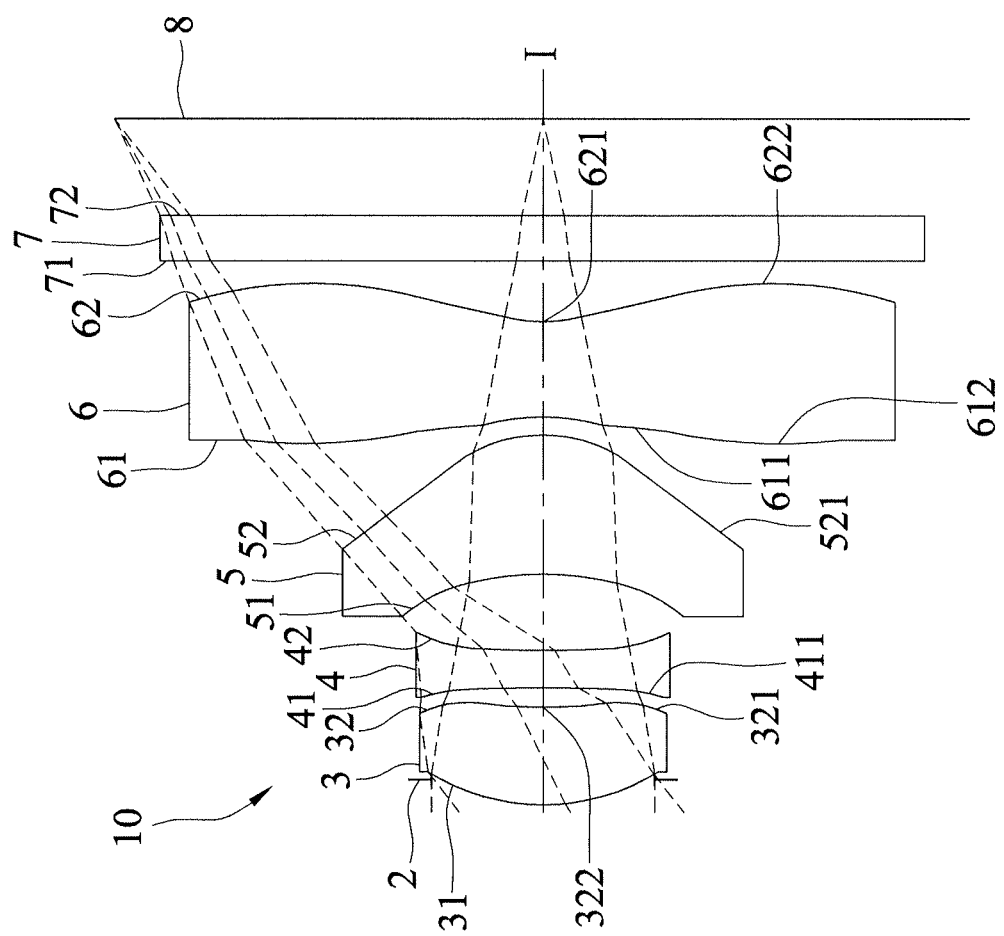
FIG. 26 is a schematic diagram that illustrates the seventh preferred embodiment of an imaging lens according to the present invention.

FIG. 26 illustrates the seventh preferred embodiment of an imaging lens 10 according to the present invention. The differences between the first and seventh preferred embodiments of the imaging lens 10 of this invention reside in that, in the seventh preferred embodiment, the image-side surface 32 of the first lens element 3 has a concave 322 portion in a vicinity of the optical axis (I), and a convex portion 321 in a vicinity of a periphery of the first lens element 3.

Shown in FIG. 27 is a table that lists values of some optical data corresponding to the surfaces 31-71, 32-72 of the seventh preferred embodiment. The imaging lens 10 has an overall system focal length of 3.613 mm, an HFOV of 38.277°, an F-number of 2.40, and a system length of 4.552 mm.

Shown in FIG. 28 is a table that lists values of some aspherical coefficients of the aforementioned relationship (1) corresponding to the seventh preferred embodiment.

Relationships among some of the aforementioned lens parameters corresponding to the seventh preferred embodiment are shown in columns of FIGS. 34 and 35 corresponding to the seventh preferred embodiment.

Figure 29:
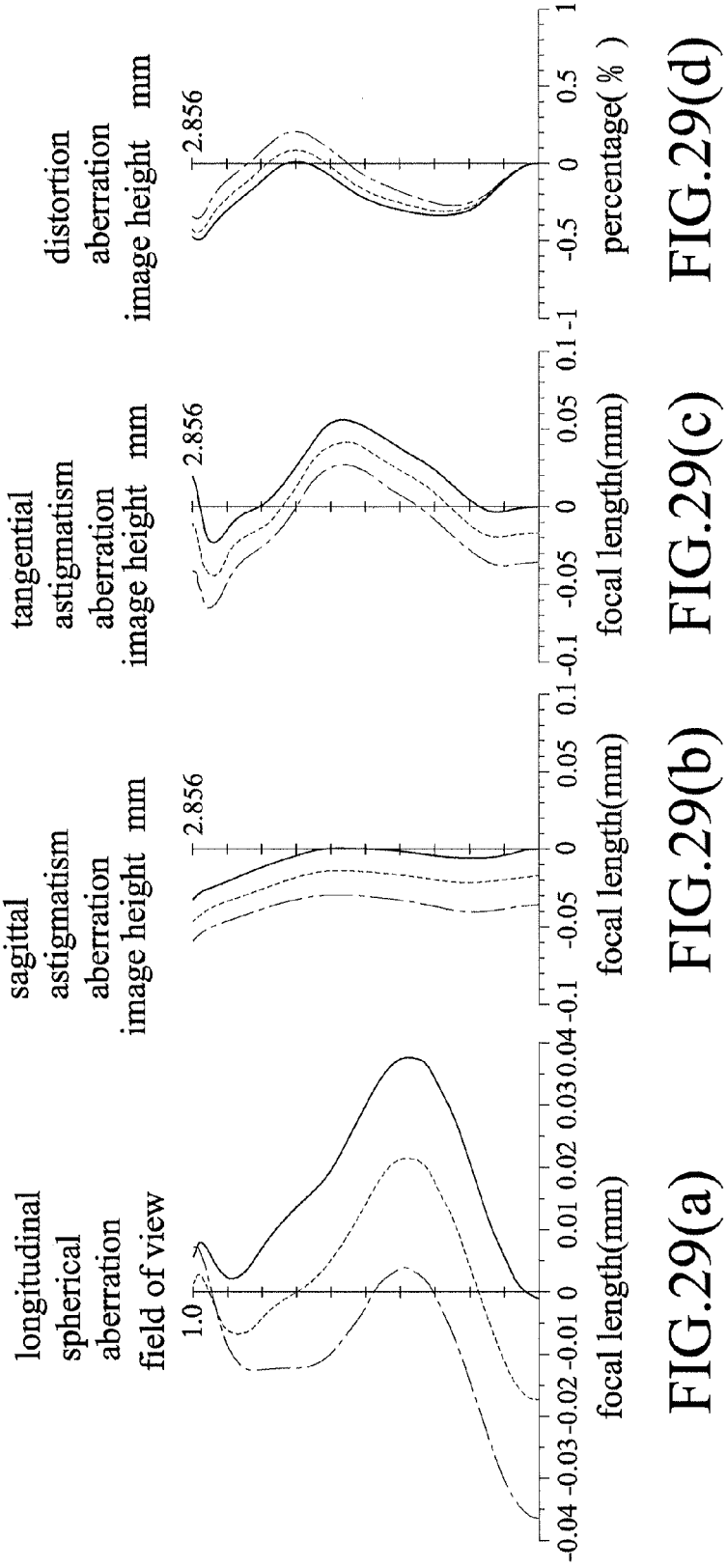
FIGS. 29(a) to 29(d) show different optical characteristics of the imaging lens of the seventh preferred embodiment.

FIGS. 29(*a*) to 29(*d*) respectively show simulation results corresponding to longitudinal spherical aberration, sagittal astigmatism aberration, tangential astigmatism aberration, and distortion aberration of the seventh preferred embodiment. It can be understood from FIGS. 29(*a*) to 29(*d*) that the seventh preferred embodiment is able to achieve a relatively good optical performance.

Figure 30:
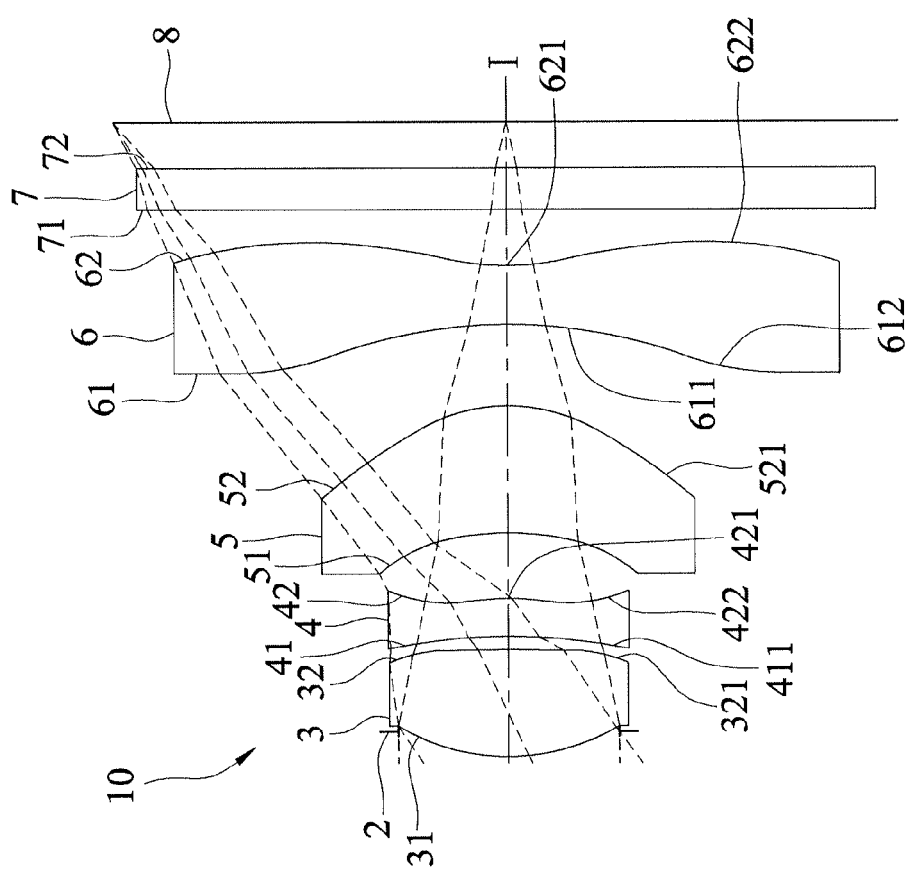
FIG. 30 is a schematic diagram that illustrates the eighth preferred embodiment of an imaging lens according to the present invention.

Referring to FIG. 30, the differences between the first and eighth preferred embodiments of the imaging lens 10 of this invention reside in that, in the eighth preferred embodiment, the image-side surface 42 of the second lens element 4 has a convex portion 421 in a vicinity of the optical axis (I), and a concave portion 422 in a vicinity of a periphery of the second lens element 4.

Shown in FIG. 31 is a table that lists values of some optical data corresponding to the surfaces 31-71, 32-72 of the eighth preferred embodiment. The imaging lens 10 has an overall system focal length of 3.821 mm, an HFOV of 36.181°, an F-number of 2.40, and a system length of 4.617 mm.

Shown in FIG. 32 is a table that lists values of some aspherical coefficients of the aforementioned relationship (1) corresponding to the eighth preferred embodiment.

Relationships among some of the aforementioned lens parameters corresponding to the eighth preferred embodiment are shown in columns of FIGS. 34 and 35 corresponding to the eighth preferred embodiment.

Figure 33:
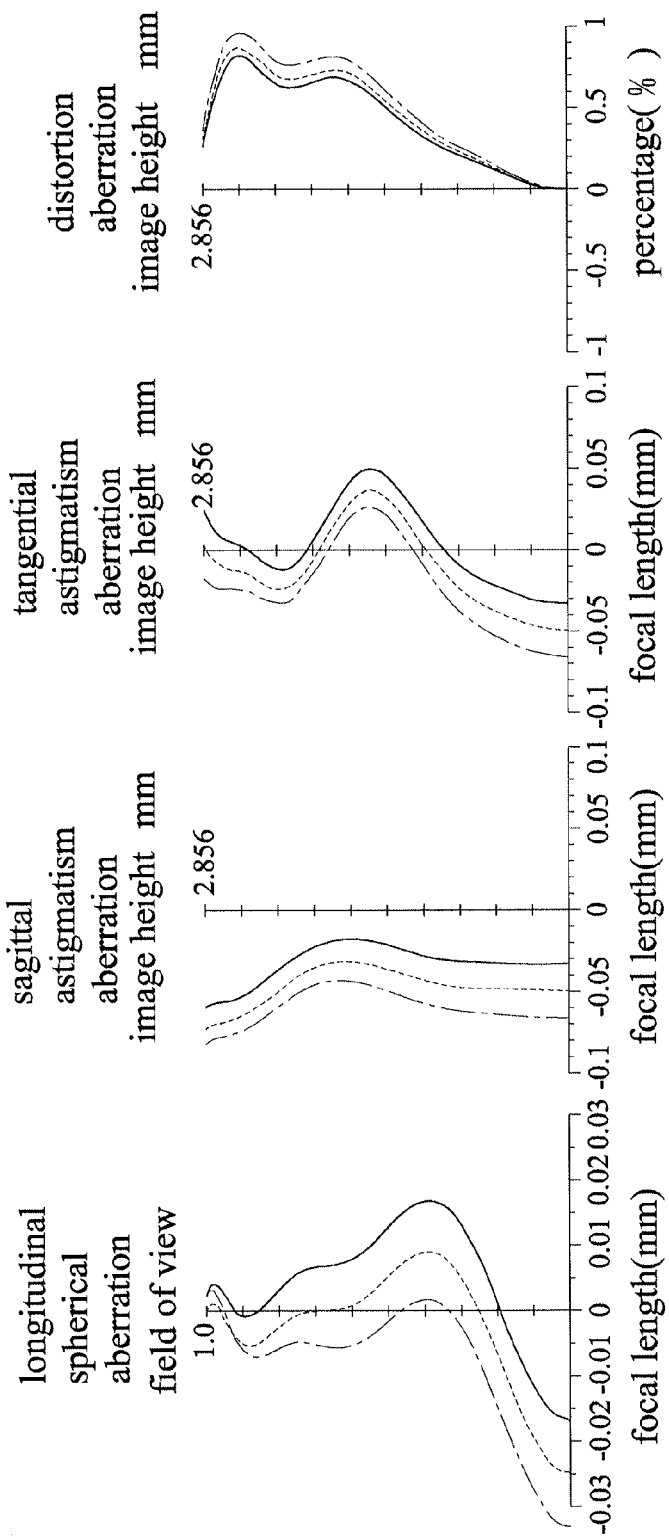
FIGS. 33(a) to 33(d) show different optical characteristics of the imaging lens of the eighth preferred embodiment.

FIGS. 33(*a*) to 33(*d*) respectively show simulation results corresponding to longitudinal spherical aberration, sagittal astigmatism aberration, tangential astigmatism aberration, and distortion aberration of the eighth preferred embodiment.

It can be understood from FIGS. 33(a) to 33(d) that the eighth preferred embodiment is able to achieve a relatively good optical performance.

Shown in FIGS. 34 and 35 are tables that list the aforesaid relationships among some of the aforementioned lens parameters corresponding to the eight preferred embodiments for comparison. It should be noted that the values of the lens parameters and the relationships listed in FIGS. 34 and 35 are rounded off to the third decimal place. When each of the lens parameters of the imaging lens 10 according to this invention satisfies the following relationships, the optical performance is still relatively good even with the reduced system length:

(1) EFL/T4≤8.5: Since reduction in EFL favors reduction in the system length, and the fourth lens element 6 having a relatively large effective optical diameter should have a sufficient thickness for ease of manufacture thereof, the system length of the imaging lens 10 may be effectively reduced when EFL/T4 is designed to be small. Preferably, 5≤EFL/T4≤8.5.

(2) T3/G23≤1.9: Since the third lens element 5 has a relatively small effective optical diameter, the design of T3 may tend to be small. Since the third lens element 5 has a positive refractive power, G23 should be designed to be within a proper range to allow light entering the third lens element 5 at an appropriate height for convergence. Therefore, good optical performance may be maintained with the reduced system length when this relationship is satisfied. Preferably, 0.9≤T3/G23≤1.9.

(3) 1.5≤T4/(G12+G34): The fourth lens element 6 has a relatively large effective optical diameter, and a relatively large T4 which facilitates ease of manufacture thereof is required. By virtue of configurations of the convex portion 321 of the first lens element 3 and the concave portion 411 of the second lens element 4, G12 may be made smaller without causing edge interference between the first and second lens elements 3 and 4. By virtue of configurations of the convex portion 521 of the third lens element 5 and a large difference in the effective optical diameters between the third and fourth lens elements 5, 6, G34 may be made smaller without causing edge interference between the third and fourth lens elements 5 and 6. Therefore, design of T4/(G12+G34) should tend to be small. Preferably, 1.5≤T4/(G12+G34)≤4.8.

(4) 1.9≤T4/G34: As mentioned above, it is relatively difficult to reduce T4, whereas the reducible ratio of G34 is relatively large. Therefore, design of T4/G34 should tend to be large. Preferably, 1.9≤T4/G34≤8.5.

(5) 1.6≤G23/(G12+G34): As mentioned above, since G23 should be designed to be within a proper range and the reducible ratios of G12 and G34 are relatively large, design of G23/(G12+G34) should tend to be large. When the imaging lens 10 further satisfies condition of 1.6≤G23/(G12+G34)≤3, G34 is allowed to be larger, thus resulting in a relatively simple assembling process. Preferably, 1.6≤G23/(G12+G34)≤4.2.

(6) AAG/T4≤3: As mentioned above, T4 should be made thicker for ease of manufacture of the fourth lens element 6, and reduction in AAG favors reduction of the system length of the imaging lens 10. Thus, design of AAG/T4 should tend to be small. Preferably, 0.7≤AAG/T4≤3.

(7) T1/G23≤1.55: Since the surface profile of the first lens element 3 around the optical axis (I) is not limited, and the effective optical diameter of the first lens element 3 is relatively small, the first lens element 3 may be manufactured to have a relatively small thickness. As mentioned above, G23 should be sufficiently large to maintain good optical performance. Thus, design of T1/G23 should tend to be small. Preferably, 0.65≤T1/G23≤1.55.

(8) 3.9≤BFL/T2: Since the surface profile of the second lens element 4 around the optical axis (I) is not limited, and the effective optical diameter of the second lens element 4 is relatively small, the second lens element 4 may be manufactured to have a relatively small thickness. Design of BFL should be sufficient for accommodating the optical filter 7 and other elements. Thus, design of BFL/T2 should tend to be large. Preferably, 3.9≤BFL/T2≤6.5.

(9) TTL/T4≤9.35: As mentioned above, T4 should be sufficiently large for ease of manufacture of the fourth lens element 6 while TTL is reduced. Thus, the design of TTL/T4 should tend to be small. Preferably, 6≤TTL/T4≤9.35.

(10) T2/G23≤0.8: As mentioned above, G23 should be designed to be within a proper range, and the reducible ratio of T2 is relatively large. Thus, design of T2/G23 should tend to be small. Preferably, 0.2≤T2/G23≤0.8.

(11) 3.8≤BFL/(G12+G34): As mentioned above, BFL should be sufficiently large, and the reducible ratios of G12 and G34 are relatively large. Thus, design of BFL/(G12+G34) should tend to be large. Preferably, 3.8≤BFL/(G12+G34)≤9.

(12) ALT/G23≤5.5: Since reduction in ALT favors reduction of the system length of the imaging lens 10, and G23 should be designed to be within a proper range, design of ALT/G23 should tend to be small. Preferably, 2.8≤ALT/G23≤5.5.

(13) 2.0≤BFL/T1: Since reducible ratio of T1 is relatively large and BFL should be sufficiently large, design of BFL/T1 should tend to be large. Preferably, 2≤BFL/T1≤2.7.

(14) T3/T4≤2.15: As mentioned above, T4 is relatively large and T3 is relatively small. Thus, design of T3/T4 should tend to be small. Preferably, 1≤T3/T4≤2.15

(15) T2/T4≤0.7: As mentioned above, T4 is relatively large and T2 is relatively small. Thus, design of T2/T4 should tend to be small. Preferably, 0.2≤T2/T4≤0.7.

To sum up, effects and advantages of the imaging lens 10 according to the present invention are described hereinafter.

1. By virtue of the third lens element 5 with the positive refractive power that provides a portion of the positive refractive power required by the imaging lens 10, the convex portion 321, the concave portion 411, the convex portion 521, the concave portion 611 and the convex portion 612, image aberration of the imaging lens 10 may be corrected. Since the fourth lens element 6 is made of a plastic material, weight and cost of the imaging lens 10 may be reduced.

2. Through design of the relevant optical parameters, such as EFL/T4, T3/G23, T4/(G12+G34), T4/G34, G23/(G12+G34), AAG/T4, T1/G23, BFL/T2, TTL/T4, T2/G23, BFL/(G12+G34), ALT/G23, BFL/T1, T3/T4 and T2/T4, optical aberrations, such as spherical aberration, may be reduced or even eliminated. Further, through surface design and arrangement of the lens elements 3-6, even with reduced system length, optical aberrations may still be reduced or even eliminated, resulting in relatively good optical performance.

3. Through the aforesaid eight preferred embodiments, it is known that the system length (TTL) of this invention may be reduced down to below 5 mm. As compared to the conventional imaging lens, the present invention provides a relatively compact imaging lens so as to facilitate developing relevant products and to meet market requirements while maintaining good optical performance.

Figure 36:
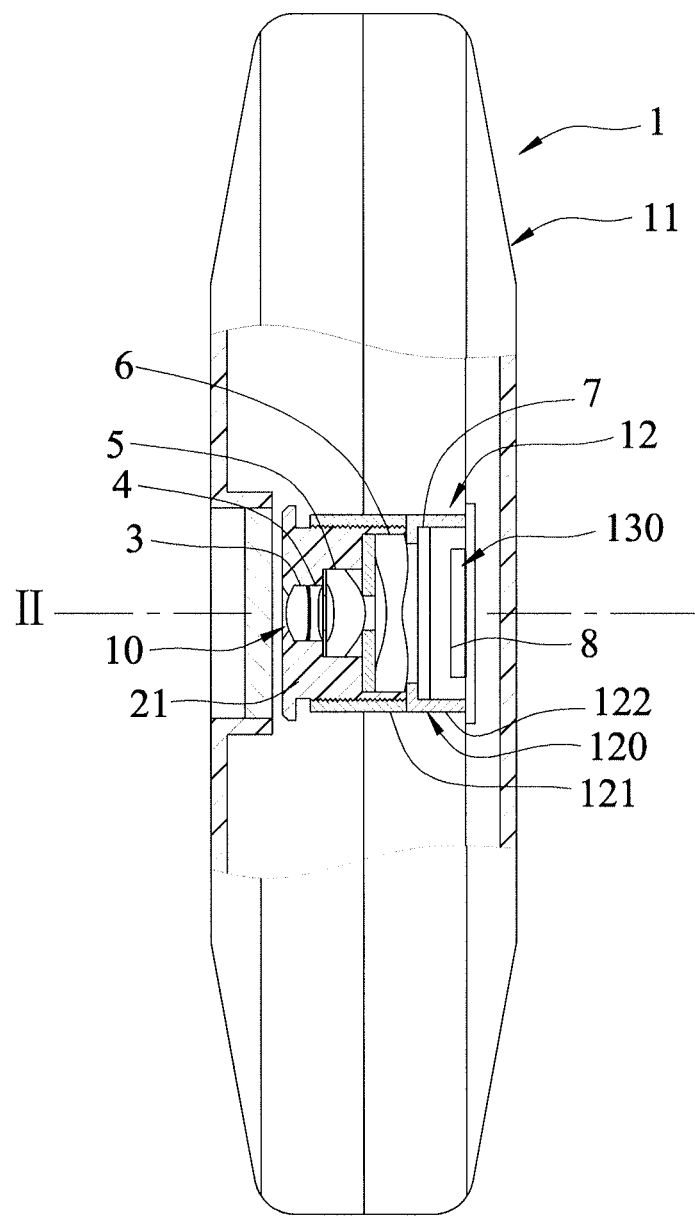
FIG. 36 is a schematic partly sectional view to illustrate a first exemplary application of the imaging lens of the present invention.

Shown in FIG. 36 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 8 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10. It should be noted that the image sensor 130 in this embodiment is packaged using chip on board (COB) techniques. Compared to the conventional CSP (chip scale package), a cover glass is not required for the COB technique. Hence, the imaging lens of the present invention does not include the cover glass, but the present invention should not be limited in this respect.

Figure 37:
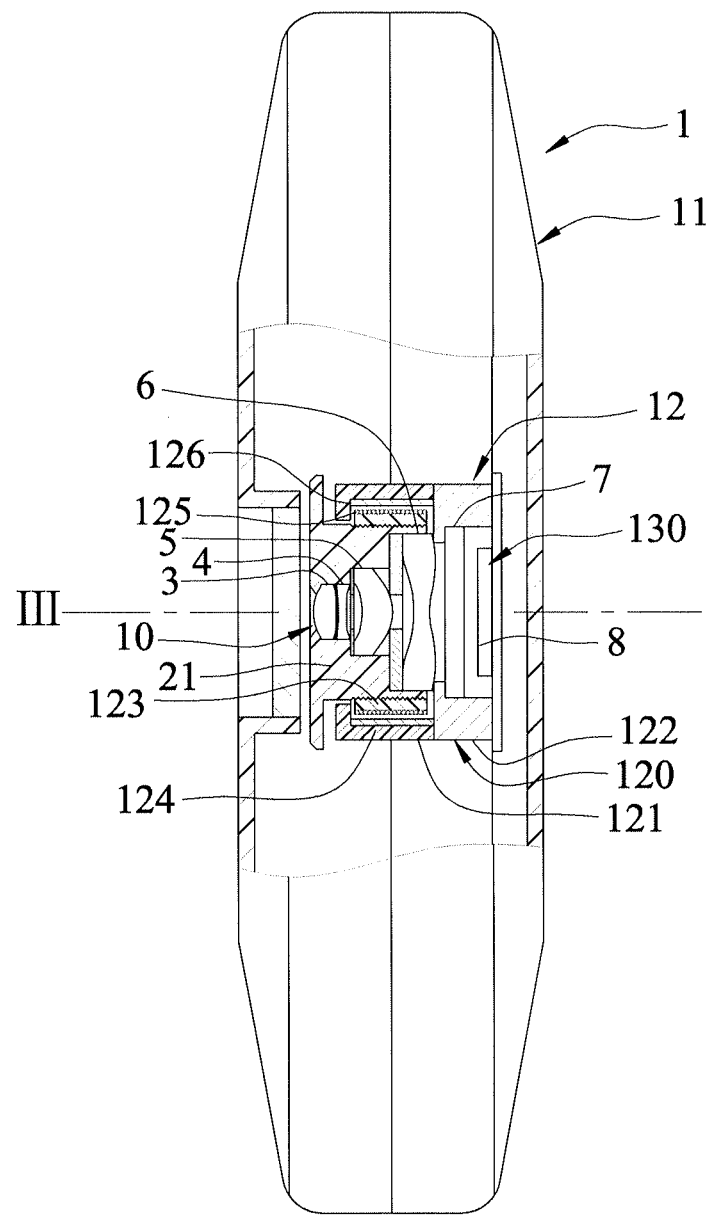
FIG. 37 is a schematic partly sectional view to illustrate a second exemplary application of the imaging lens of the present invention.

Shown in FIG. 37 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, and a fourth lens element arranged in order from an object side to an image side along an optical axis of said imaging lens, each of said first lens element, said second lens element, said third lens element and said fourth lens element having a refractive power, an object-side surface facing toward the object side, and an image-side surface facing toward the image side, wherein:

said image-side surface of said first lens element has a convex portion in a vicinity of a periphery of said first lens element;

said object-side surface of said second lens element has a concave portion in a vicinity of a periphery of said second lens element;

said third lens element has a positive refractive power, and said image-side surface of said third lens element has a convex portion in a vicinity of a periphery of said third lens element;

said fourth lens element is made of a plastic material, and said object-side surface of said fourth lens element has a concave portion in a vicinity of the optical axis, and a convex portion in a vicinity of a periphery of said fourth lens element; and said imaging lens does not include any lens element with refractive power other than said first lens element, said second lens element, said third lens element and said fourth lens element.

2. An electronic apparatus comprising:

a housing; and an imaging module disposed in said housing, and including an imaging lens as claimed in claim 1, a barrel on which said imaging lens is disposed, a holder unit on which said barrel is disposed, and an image sensor disposed at the image side of said imaging lens.

3. The imaging lens as claimed in claim 1, satisfying $T3/T4 \leq 2.15$, where T3 represents a thickness of said third lens element at the optical axis, and T4 represents a thickness of said fourth lens element at the optical axis.

4. The imaging lens as claimed in claim 3, further satisfying $T2/T4 \leq 0.7$, where T2 represents a thickness of said second lens element at the optical axis.

5. The imaging lens as claimed in claim 1, satisfying $AAG/T4 \leq 3$, where AAG represents a sum of air gap lengths among said first lens element, said second lens element, said third lens element and said fourth lens element at the optical axis, and T4 represents a thickness of said fourth lens element at the optical axis.

6. The imaging lens as claimed in claim 5, further satisfying $T1/G23 \leq 1.55$, where T1 represents a thickness of said first lens element at the optical axis, and G23 represents the air gap length between said second lens element and said third lens element at the optical axis.

7. The imaging lens as claimed in claim 6, further satisfying $3.9 \leq BFL/T2$, where BFL represents a distance at the optical axis between said image-side surface of said fourth lens element and an image plane at the image side, and T2 represents a thickness of said second lens element at the optical axis.

8. The imaging lens as claimed in claim 1, satisfying $ALT/G23 \leq 5.5$, where ALT represents a sum of thicknesses of said first lens element, said second lens element, said third lens element and said fourth lens element at the optical axis, and G23 represents an air gap length between said second lens element and said third lens element at the optical axis.

9. The imaging lens as claimed in claim 8, further satisfying $2.0 \leq BFL/T1$, where BFL represents a distance at the optical axis between said image-side surface of said fourth lens element and an image plane at the image side, and T1 represents the thickness of said first lens element at the optical axis.

10. The imaging lens as claimed in claim 9, further satisfying $1.6 \leq G23/(G12+G34) \leq 3$, where G12 represents an air gap length between said first lens element and said second lens element at the optical axis, and G34 represents an air gap length between said third lens element and said fourth lens element at the optical axis.

11. The imaging lens as claimed in claim 1, satisfying $TTL/T4 \leq 9.35$, where TTL represents a distance at the optical axis between said object-side surface of said first lens element and an image plane at the image side, and T4 represents a thickness of said fourth lens element at the optical axis.

12. The imaging lens as claimed in claim 11, further satisfying $T2/G2 \leq 0.8$, where T2 represents a thickness of said second lens element at the optical axis, and G23 represents an air gap length between said second lens element and said third lens element at the optical axis.

13. The imaging lens as claimed in claim 11, further satisfying $3.8 \leq BFL/(G12+G34)$, where BFL represents a distance at the optical axis between said image-side surface of said fourth lens element and the image plane at the image side, G12 represents an air gap length between said first lens element and said second lens element at the optical axis, and G34 represents an air gap length between said third lens element and said fourth lens element at the optical axis.

14. The imaging lens as claimed in claim 1, satisfying $EFL/T4 \leq 8.5$, where EFL represents a system focal length of said imaging lens, and T4 represents a thickness of said fourth lens element at the optical axis.

15. The imaging lens as claimed in claim 14, further satisfying $T3/G23 \leq 1.9$, where T3 represents a thickness of said third lens element at the optical axis, and G23 represents an air gap length between said second lens element and said third lens element at the optical axis.

16. The imaging lens as claimed in claim 15, further satisfying $1.5 \leq T4/(G12+G34)$, where G12 represents an air gap length between said first lens element and said second lens element at the optical axis, and G34 represents an air gap length between said third lens element and said fourth lens element at the optical axis.

17. The imaging lens as claimed in claim 14, further satisfying $1.9 \leq T4/G34$, where G34 represents an air gap length between said third lens element and said fourth lens element at the optical axis.

18. The imaging lens as claimed in claim 17, further satisfying $1.6 \leq G23/(G12+G34)$, where G12 represents an air gap length between said first lens element and said second lens element at the optical axis, and G23 represents an air gap length between said second lens element and said third lens element at the optical axis.

\* \* \* \* \*